US012447391B2

(12) United States Patent
Mikami et al.

(10) Patent No.: US 12,447,391 B2
(45) Date of Patent: Oct. 21, 2025

(54) EXERCISE INFORMATION OUTPUT APPARATUS, EXERCISE INFORMATION OUTPUT METHOD, AND PROGRAM

(71) Applicant: NTT, Inc., Tokyo (JP)

(72) Inventors: Dan Mikami, Tokyo (JP); Takehiro Fukuda, Tokyo (JP); Naoki Saijo, Tokyo (JP); Masumi Yamaguchi, Tokyo (JP); Makio Kashino, Tokyo (JP); Susumu Yamamoto, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/269,928

(22) PCT Filed: Jan. 6, 2021

(86) PCT No.: PCT/JP2021/000162
§ 371 (c)(1),
(2) Date: Jun. 27, 2023

(87) PCT Pub. No.: WO2022/149201
PCT Pub. Date: Jul. 14, 2022

(65) Prior Publication Data
US 2024/0066379 A1 Feb. 29, 2024

(51) Int. Cl.
*G09B 19/00* (2006.01)
*A63B 24/00* (2006.01)
*A63B 69/00* (2006.01)
*A63B 71/06* (2006.01)
*G06T 11/20* (2006.01)

(52) U.S. Cl.
CPC ...... *A63B 71/0622* (2013.01); *A63B 24/0021* (2013.01); *A63B 69/0002* (2013.01); *G06T 11/206* (2013.01); *A63B 2024/0034* (2013.01); *A63B 2069/0006* (2013.01); *G06T 2200/24* (2013.01)

(58) Field of Classification Search
CPC .................................................. A61B 24/0021
See application file for complete search history.

(56) References Cited

U.S. PATENT DOCUMENTS

| | | | |
|---|---|---|---|
| 10,471,330 B1* | 11/2019 | Hart | A63B 69/406 |
| 2006/0035731 A1* | 2/2006 | Husband | A63B 24/0021 |
| | | | 473/422 |
| 2010/0041498 A1* | 2/2010 | Adams | A63B 24/0006 |
| | | | 473/451 |
| 2011/0190912 A1* | 8/2011 | Paul | G16Z 99/00 |
| | | | 700/93 |
| 2014/0013361 A1* | 1/2014 | Monari | H04N 21/41415 |
| | | | 725/62 |

(Continued)

FOREIGN PATENT DOCUMENTS

WO 2017/131071 A1 8/2017

*Primary Examiner* — Peter R Egloff

(57) ABSTRACT

Information for displaying information representing rotation axes of balls seen from a first point side or a second point side in regard to one or more motions of the balls moving from the first point side to the second point side is output, and information for displaying information representing rotation axes of the balls seen from an outer side located in a direction that is orthogonal to a virtual straight line connecting the first point to the second point in regard to the motions is output.

12 Claims, 18 Drawing Sheets

(56) References Cited

U.S. PATENT DOCUMENTS

| | | | |
|---|---|---|---|
| 2014/0277636 A1* | 9/2014 | Thurman | A63B 69/0002 |
| | | | 700/91 |
| 2016/0354665 A1 | 12/2016 | Greenwalt et al. | |
| 2016/0354666 A1* | 12/2016 | Greenwalt | G09B 19/0038 |
| 2019/0022492 A1 | 1/2019 | Takahashi et al. | |
| 2019/0258905 A1* | 8/2019 | Rankin | G01P 15/034 |
| 2020/0238153 A1* | 7/2020 | Shin | G06F 3/011 |

* cited by examiner

EXERCISE INFORMATION OUTPUT APPARATUS, EXERCISE INFORMATION OUTPUT METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2021/000162, filed on 6 Jan. 2021, the disclosure of which is hereby incorporated herein by reference in its entirety.

TECHNICAL FIELD

The present invention relates to a technology for displaying information regarding ball motion.

BACKGROUND ART

Patent Literature 1 discloses a virtual environment construction technology that enables a game experience from a viewpoint of a player. Here, a technology of obtaining information regarding how much an object has rotated with respect to a reference posture from details of a surface of the imaged object (for example, seams or patterns of a ball), converting such information into a position and a posture of a virtual dynamic material (for example, CG data of a ball for baseball) in a virtual space, and outputting time-series data regarding the position and the posture of the virtual dynamic material.

PRIOR ART LITERATURE PATENT LITERATURE

Patent Literature 1: WO 2017/131071

SUMMARY OF INVENTION

Problems to be Solved by the Invention

However, a method for two-dimensionally displaying information regarding a rotation axis of a ball that is moving while rotating in a three-dimensional space such that a relationship with a change in trajectory of the ball is easy to understand is not known.

The present invention has been made in view of such a point, and an object thereof is to two-dimensionally display information regarding a rotation axis of a ball that is moving while rotating in a three-dimensional space such that a relationship with a change in trajectory of the ball is easy to understand.

Means to Solve the Problems

In order to solve the aforementioned problem, information for displaying information representing rotation axes of balls seen from a first point side or a second point side in regard to one or more motions of the balls moving from the first point side to the second point side is output, and information for displaying information representing the rotation axes of the balls seen from an outer side located in a direction that is orthogonal to a virtual straight line connecting the first point to the second point in regard to the motions is output.

For example, information for displaying information representing rotation axes of balls seen from a pitcher side or a batter side in regard to pitching performed one or more times in which the balls are thrown from the pitcher side to the batter side is output, and information for displaying information representing the rotation axes of the balls seen from above or below the balls in regard to the pitching is output.

Effects of Invention

It is thus possible to two-dimensionally display information regarding a rotation axis of a ball that is moving while rotating in a three-dimensional space such that a relationship with a change in trajectory of the ball is easy to understand.

DETAILED DESCRIPTION OF EMBODIMENTS

Hereinafter, an embodiment of the present invention will be described with reference to the drawings.

First Embodiment

First, a first embodiment of the present invention will be described. In the present embodiment, an example in which motion information regarding pitching performed by a pitcher of baseball or the like is displayed will be described.

<Configuration>

Figure 1:
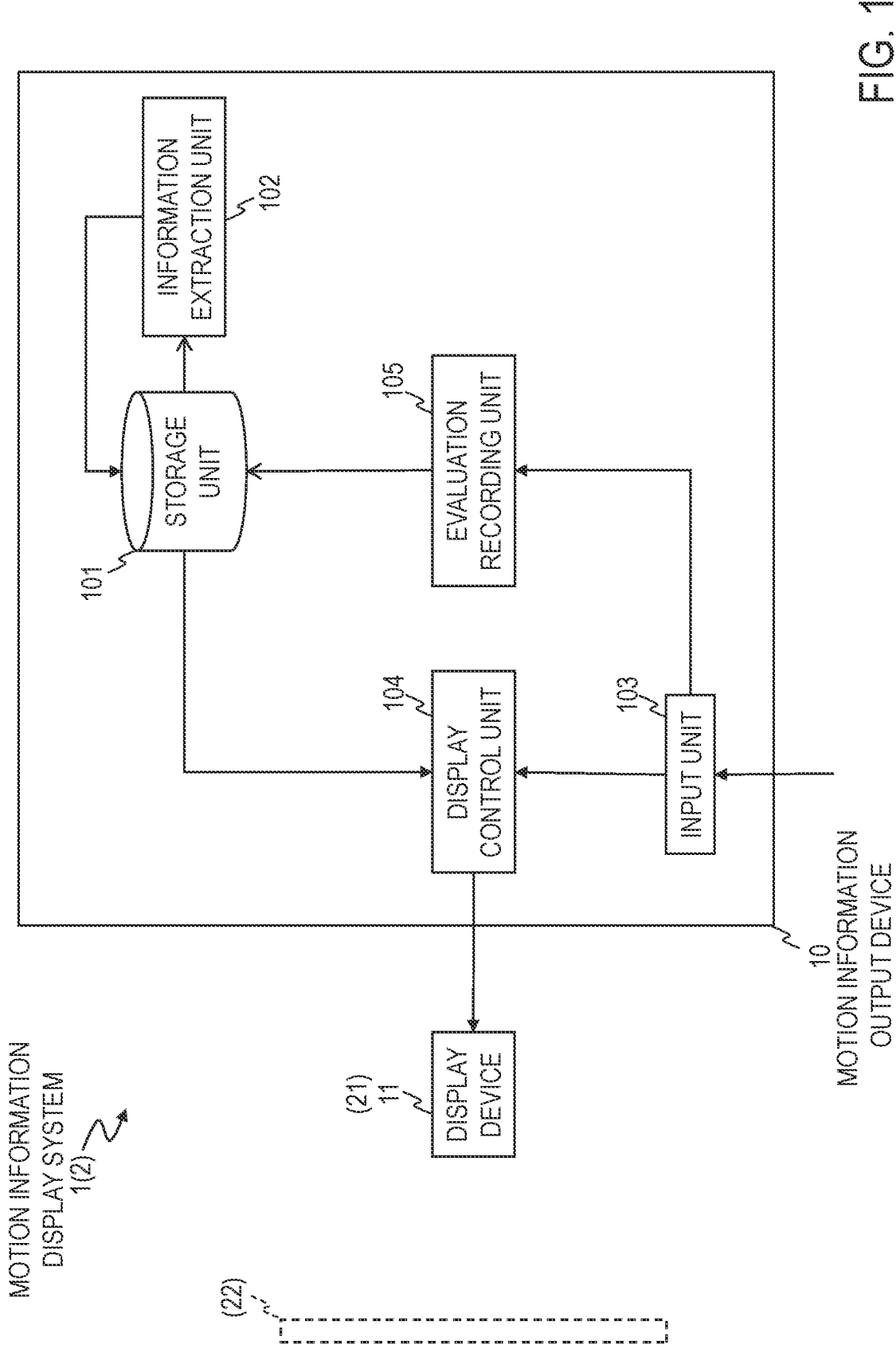
FIG. 1 is a block diagram illustrating, as an example, a functional configuration of a motion information output device according to an embodiment.

FIG. 1 is a block diagram illustrating, as an example, a configuration of a motion information display system 1 according to the first embodiment.

As illustrated as an example in FIG. 1, the motion information display system 1 according to the present embodiment includes a motion information output device 10 and a display device 11. The motion information output device 10 according to the present embodiment includes a storage unit 101, an information extraction unit 102, an input unit 103, a display control unit 104, and an evaluation recording unit 105. As will be described later, an example of the motion information output device 10 is a device configured by a computer reading a program. The display device 11 is a device that displays a video on the basis of input information. An example of the display device 11 is a display, a transparent display, smart glasses, VR goggles, or the like.

<Pre-Processing>

As pre-processing, one or more pitchers perform pitching of one or more ball types one or more times, and the state of the pitching is imaged as a video. In the present embodiment, an example in which a state of pitching of a pitcher is imaged from a batter side (a catcher side; behind a back net) in regard to pitching in which a ball is thrown from the pitcher side to the batter side will be described. The video obtained by imaging the state of the pitching will be referred to as a "pitching video". The pitching video includes a video representing not only a motion of the pitcher at the time of the pitching but also a motion of the thrown ball (movement, rotation, and the like of the ball). Also, the motion of the thrown ball is measured by various sensors. Examples of such sensors include a Doppler radar (for example, a Track-Man). The measurement result obtained by measuring the motion of the thrown ball will be referred to as a "pitching measurement result". The thus obtained pitching video and the pitching measurement result are associated with a "pitching attribute" corresponding thereto and are then stored in the storage unit 101. The pitching attribute is information representing an attribute of each pitching video. Examples of the pitching attribute include information specifying a pitching pitcher (for example, a pitcher's name, an identifier, or the like), information specifying a batter to whom the ball is thrown (for example, a batter's name, an identifier, or the like), attributes of the pitcher (for example, a team, an age, information indicating right-handed pitching or left-handed pitching, and the like), attributes of the batter (for example, a team, an age, information indicating right-handed batting or left-handed batting), ball types of thrown pitch (for example, curve, slider, change-up, straight, (fastball (hereinafter referred to as "FB")), and the like, throwing date and time, throwing video imaging date and time, information specifying an inning, and the like. The pitching attribute may include all of these, may include only some of these, or may include other information.

The information extraction unit 102 extracts information for (visually) displaying motion information regarding pitching performed each time from the pitching video and the pitching measurement result stored in the storage unit 101 and stores the information in the storage unit 101 in association with the pitching attribute of the pitching performed each time. For example, the information extraction unit 102 extracts the following information as the information for displaying the motion information in regard to the pitching performed each time and stores the information in the storage unit 101 in association with the pitching attribute of the pitching performed each time.

(1) Information for (visually) displaying a rotation axis of a ball seen from the batter side in regard to the pitching performed each time (rotation axis XY: front (the viewpoint of the batter))

(2) Information for (visually displaying) the rotation axis of the ball seen from above the ball (the side right above the ball, for example) in regard to the pitching performed each time (3) Information for (visually) displaying the amount of rotation of the ball (for example, a rotation frequency, a rotation speed) in regard to the pitching performed each time (4) Information for (visually) displaying the amount of change in trajectory of the ball seen from the pitcher side (5) Information for (visually) displaying the position where the thrown ball passes on the batter side (above home base, for example)

(6) Information for (visually) displaying the amount of change in trajectory of the ball, from which an influence of gravity has been removed, which is seen from the pitcher side (1) Information for Displaying a Rotation Axis of a Ball Seen from the Batter Side in Regard to Pitching Performed Each Time (Rotation Axis XY: Front (the Viewpoint of the Batter))

Examples of the information include two-dimensional coordinates representing the rotation axis of the ball seen from the batter side, an angle between a predetermined reference axis of a two-dimensional coordinate system of the ball seen from the batter side and the rotation axis of the ball seen from the batter side, and the like. The two-dimensional coordinates representing the rotation axis of the ball seen from the batter side may be any coordinates as long as they allow the rotation axis of the ball seen from the batter side to be specified. Preferably, it is desirable that the two-dimensional coordinates representing the rotation axis of the ball seen from the batter side be coordinates with which it is possible to specify both the rotation axis and the rotation direction of the ball seen from the batter side. For example, two-dimensional coordinates $(x_1, y_1)$ at which the rotation axis of the ball seen from the batter side is located on a straight line $L_1$ passing through the two-dimensional coordinates $(x_1, y_1)$ and the origin $(0, 0)$ in a two-dimensional coordinate system (for example, an orthogonal coordinate system including an X axis and a Y axis) of the ball seen from the batter side is assumed to be the two-dimensional coordinates representing the rotation axis of the ball seen from the batter side. More preferably, two-dimensional coordinates $(x_1, y_1)$ at which the rotation axis of the ball seen from the batter side is located on the straight line $L_1$ and a predetermined rotation direction $R_{XY}$ around the straight line $L_1$ when the two-dimensional coordinates $(x_1, y_1)$ are seen from the origin $(0, 0)$ (the rightward rotation direction or the leftward rotation direction) is the rotation direction of the ball seen from the batter side is assumed to be the two-dimensional coordinates representing the rotation axis of the ball seen from the batter side. In a case where the predetermined rotation direction $R_{XY}$ is the rightward rotation direction, for example, the side of the direction which the middle finger tip faces when the little finger side of the right hand is arranged on the side of the origin $(0, 0)$ and the thumb side is arranged on the side of the two-dimensional coordinates $(x_1, y_1)$ is the rotation direction of the ball seen from the batter side. Also, in a case where the predetermined rotation direction $R_{XY}$ is the leftward rotation direction, for example, the side of the direction which the middle finger tip faces when the little finger side of the left hand is arranged on the side of the origin $(0, 0)$ and the thumb side is arranged on the side of the two-dimensional coordinates $(x_1, y_1)$ is the rotation direction of the ball seen from the batter side. Note that the two-dimensional coordinate system of the ball seen from the batter side may be any coordinate system in a two-dimensional plane as long as it two-dimensionally displays an image of the ball seen from the batter side. An example of the two-dimensional coordinate system of the ball seen from the batter side is a two-dimensional coordinate system in a plane that is substantially orthogonal to a coordinate axis (for example, a Z axis) on which a viewpoint on the batter side is located (for example, an orthogonal coordinate system including an X axis and a Y axis). Note that "substantially " means "" or about "**". Also, the rotation axis of the ball seen from the batter side is obtained by projection-converting (for example, perspective-projection-converting or parallel-projection-converting) the rotation axis of the ball in a three-dimensional space into the two-dimensional plane of the two-dimensional coordinate system. Moreover, an example of the predetermined reference axis of the two-dimensional coordinate system of the ball seen from the batter side is the X axis or the Y axis of the two-dimensional coordinate system. The information for displaying the rotation axis of the ball seen from the batter side may be obtained from the pitching video or may be obtained from the pitching measurement result. The information for displaying the rotation axis of the ball seen from the batter side can be obtained by using the method described in Reference Literature 1, for example, or known projection conversion.

Reference Literature 1: Takashi Ijiri, Atsushi Nakamura, Akira Hirabayashi, Wataru Sakai, Takeshi Miyazaki, Ryutaro Himeno, "Automatic Spin Measurements for Pitched Baseballs via Consumer-Grade High-Speed Cameras," Signal Image Video and Process. 2017 Nov. 7. 1197-1204.

(2) Information for Displaying the Rotation Axis of the Ball Seen from Above the Ball (the Side Right Above the Ball, for Example) in Regard to Pitching Performed Each Time Examples of the information include two-dimensional coordinates representing the rotation axis of the ball seen from above the ball, an angle between a predetermined reference axis on the two-dimensional coordinates and the rotation axis of the ball seen from above the ball, and the like. The two-dimensional coordinates representing the rotation axis of the ball seen from above the ball may be any two-dimensional coordinates as long as they allow the rotation axis of the ball seen from above the ball to be specified. Preferably, it is desirable that the two-dimensional coordinates representing the rotation axis of the ball seen from above the ball be two-dimensional coordinates with which it is possible to specify both the rotation axis and the rotation direction of the ball seen from above the ball. For example, it is assumed that two-dimensional coordinates ($x_2$, $z_2$) at which the rotation axis of the ball seen from above the ball is located on a straight line $L_2$ passing through the two-dimensional coordinates ($x_2$, $z_2$) and the origin (0, 0) in the two-dimensional coordinate system (for example, an orthogonal coordinate system including an X axis and a Z axis) of the ball seen from above the ball is the two-dimensional coordinates representing the rotation axis of the ball seen from above the ball. More preferably, the two-dimensional coordinates ($x_2$, $z_2$) at which the rotation axis of the ball seen from above the ball is located on the straight line $L_2$ and a predetermined rotation direction $R_{XZ}$ (the rightward rotation direction or the leftward rotation direction) about the straight line $L_2$ when the two-dimensional coordinates ($x_2$, $z_2$) are seen from the origin (0, 0) is the rotation direction of the ball seen from above the ball is assumed to be the two-dimensional coordinates representing the rotation axis of the ball seen from above the ball. In a case where the predetermined rotation direction $R_{XZ}$ is the rightward rotation direction, for example, the side of a direction which the middle finger tip faces when the little finger side of the right hand is arranged on the side of the origin (0, 0) and the thumb side is arranged on the side of the two-dimensional coordinates ($x_2$, $z_2$) is the rotation direction of the ball seen from above the ball. Also, in a case where the predetermined rotation direction $R_{XZ}$ is the leftward rotation direction, for example, the side of the direction which the middle finger tip faces when the little finger side of the left hand is arranged on the side of the origin (0, 0) and the thumb side is arranged on the side of the two-dimensional coordinates ($x_2$, $z_2$) is the rotation direction of the ball seen from above the ball. Note that the two-dimensional coordinate system of the ball seen from above the ball may be any coordinate system in the two-dimensional plane as long as it two-dimensionally displays the image of the ball seen from above the ball. An example of the two-dimensional coordinate system of the ball seen from above the ball is a two-dimensional coordinate system in a plane that is orthogonal to a coordinate axis (for example, a Y axis) on which the viewpoint located above the ball is located (for example, an orthogonal coordinate system including an X axis and a Z axis). Also, the rotation axis of the ball seen from above the ball is obtained by projection-converting (for example, perspective-projection-converting or parallel-projection-converting) the rotation axis of the ball in a three-dimensional space into the two-dimensional plane of the two-dimensional coordinate system. For example, it is only necessary to use a two-dimensional coordinate system in a plane that is substantially parallel with (substantially horizontal with respect to) the ground as the two-dimensional coordinate system of the ball seen from above the ball. Also the two-dimensional coordinate system of the ball seen from above the ball is orthogonal to, for example, the aforementioned two-dimensional coordinate system of the ball seen from the batter side. Moreover, an example of the predetermined reference axis of the two-dimensional coordinate system of the ball seen from above the ball is the X axis or the Z axis of the two-dimensional coordinate system. The information for displaying the rotation axis of the ball seen from above the ball may be obtained from the pitching video or may be obtained from the pitching measurement result. The information for displaying the rotation axis of the ball seen from above the ball can be obtained by using the method described in Reference Literature 1, for example, or known projection conversion.

(3) Information for Displaying the Amount of Rotation (for Example, a Rotation Frequency, a Rotation Speed) of the Ball in Regard to the Pitching Performed Each Time The information for displaying the amount of rotation of the ball is information for displaying a rotation (autorotation) speed of the thrown ball. The amount of rotation of the ball may be, for example, a rotation frequency of the ball per frame of the pitching video or may be a rotation frequency of the ball per unit time (for example, revolutions per minute (rpm) or revolutions per second (rps)). An example of the information for displaying the amount of rotation of the ball is a numerical value representing the amount of rotation of the ball. Such information may be obtained from the pitching video or may be obtained from the pitching measurement result. Specifically, such information can be obtained using, for example, the method described in Reference Literature 1.

(4) Information for Displaying the Amount of Change (Including an Influence of Gravity) in Trajectory of the Ball Seen from the Pitcher Side This information is information for displaying the amount of change in trajectory of the ball until the thrown ball reaches the batter side. The amount of change in trajectory of the ball seen from the pitcher side is a relative position (hereinafter, referred to as a "relative arrival position") of the ball that has actually reached the batter side with respect to an arrival position (hereinafter, referred to as an "assumed arrival position") in a case where it is assumed that the ball has reached the batter side (for example, above home base) without experiencing any change, for example. The assumed arrival position is an arrival position in a case where it is assumed that the ball has reached the batter side (for example, above home base) without rotating, for example. For example, information representing the two-dimensional coordinates ($x_3$, $y_3$) representing the relative arrival position in the two-dimensional coordinate system (for example, an orthogonal coordinate system including an X axis and a Y axis) of the ball seen from the pitcher side is assumed to be the information for displaying the amount of change in trajectory of the ball seen from the pitcher side. The two-dimensional coordinates ($x_3$, $y_3$) representing the relative arrival position is, for example, on the assumption that the assumed arrival position is the origin (0, 0) of the two-dimensional coordinate system.

(5) Information for Displaying the Position Through which the Thrown Ball has Passed on the Batter Side (for Example, Above Home Base)

An example of the information is two-dimensional coordinates ($x_4$, $y_4$) representing the position through which the ball has passed on the batter side in the two-dimensional coordinate system (for example, an orthogonal coordinate system including an X axis and a Y axis) of the ball seen from the batter side. For example, the coordinates obtained by projection-converting the position through which the ball has passed on the batter side into the two-dimensional plane of the two-dimensional coordinate system are assumed to be the two-dimensional coordinates ($x_4$, $y_4$) representing the position through which the ball has passed on the batter side.

(6) Information for Displaying the Amount of Change in Trajectory of the Ball, from which an Influence of Gravity has been Removed, which is Seen from the Pitcher Side The information is information for displaying the amount of change obtained by removing the amount of change in trajectory based on gravity from the aforementioned "amount of change in trajectory of the ball seen from the pitcher side". An example of the information is information representing two-dimensional coordinates $(x_5, y_5)$ representing the position (hereinafter, referred to as a "relative arrival position from which an influence of gravity has been removed") obtained by removing the amount of change in ball based on gravity from the relative arrival position. The two-dimensional coordinates $(x_5, y_5)$ representing the relative arrival position from which an influence of gravity has been removed is, for example, on the assumption that the assumed arrival position is the origin (0, 0) of the two-dimensional coordinate system.

<Display Processing>

Next, display processing performed on the assumption of the aforementioned pre-processing will be described.

The display control unit 104 of the motion information output device 10 searches for the storage unit 101 on the basis of a search condition input to the input unit 103, extracts, from the storage unit 101, the information for displaying the motion information regarding pitching performed each time, the pitching attribute, and the pitching video to be displayed, and outputs them to the display device 11. The display device 11 displays a user interface screen 1000 that visually displays them on the basis of the information for displaying the motion information regarding the pitching performed each time, the pitching attribute, and the pitching video output from the display control unit 104 of the motion information output device 10. Hereinafter, the user interface screen 1000 will be described as an example.

<<Overview of User Interface Screen>>

Figure 2:
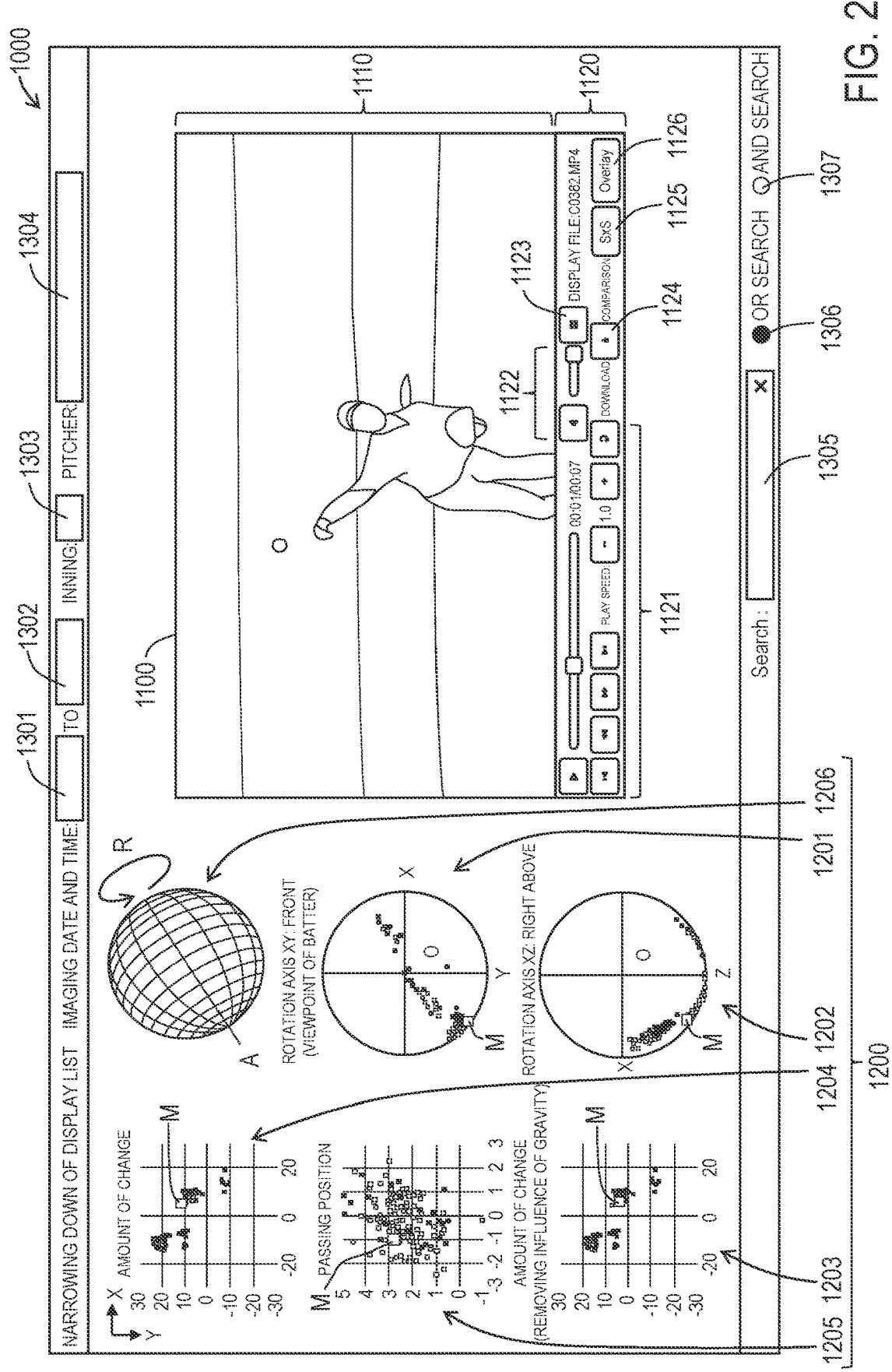
FIG. 2 is a diagram illustrating, as an example, a user interface screen displayed on the basis of information output from the motion information output device according to the embodiment.

As illustrated as an example in FIG. 2, the user interface screen 1000 includes a pitching video display unit 1100 that displays the pitching video, a pitching information display unit 1200 that displays information regarding the thrown ball, and search sections 1301, . . . , 1307 to which search conditions are to be input. The pitching information display unit 1200 includes display units 1201, . . . , 1206.

The pitching video display unit 1100 includes a projection video display unit 1110 that displays the pitching video and an operation unit 1120 that is a user interface (hereinafter, referred to as a "UI"). The operation unit 1120 is a graphical user interface (GUI) and includes a play operation unit 1121, a volume operation unit 1122, a display selection unit 1123, a download operation unit 1124, a side-by-side comparison selection unit 1125, and an overlapping selection unit 1126. The play operation unit 1121 is a UI for performing operations such as play, a play speed, stop, fast-forwarding, and rewinding of the pitching video displayed on the projection video display unit 1110. The volume operation unit 1122 is a UI for operating the volume, the display selection unit 1123 is a UI for selecting a display size of the pitching video (for example, full-screen display of only the pitching video), and the download operation unit 1124 is a UI for downloading the pitching video. The side-by-side comparison selection unit 1125 is a UI for performing an operation of displaying a plurality of pitching videos in an aligned manner, and the overlapping selection unit 1126 is a UI for performing an operation of displaying a plurality of pitching videos in an overlapping manner. States of the pitching videos displayed in response to the operation of the side-by-side comparison selection unit 1125 and the overlapping selection unit 1126 will be described later.

Figure 8A:
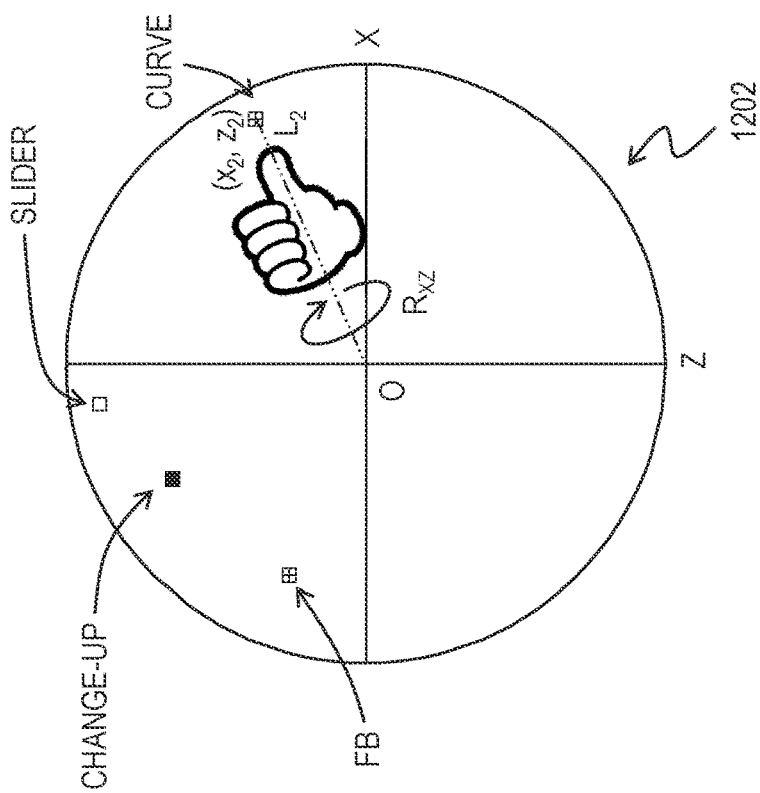
FIG. 8A is a diagram illustrating, as an example, a state where a rotation axis of a ball seen from a batter side in regard to pitching is visually displayed.

The display unit 1201 is a region where rotation axes of balls seen from the batter side is displayed in regard to pitching performed one or more times in which the balls are thrown from the pitcher side to the batter side. In the present embodiment, an example in which a rotation axis of a ball seen from the batter side in pitching performed each time is displayed by a mark arranged at the two-dimensional coordinates $(X, Y)=(x_1, y_1)$ in a two-dimensional coordinate system of the ball seen from the batter side will be described. In other words, the mark is displayed at the two-dimensional coordinates $(x_1, y_1)$ at which the rotation axis of the ball seen from the batter side is located on the straight line $L_1$ passing through the two-dimensional coordinates $(x_1, y_1)$ and the origin (0, 0) in this example, and the rotation axis of the ball seen from the batter side in pitching performed each time is thereby represented as illustrated as an example in FIG. 8A. Preferably, the mark is displayed at the two-dimensional coordinates $(x_1, y_1)$ at which the rotation axis of the ball seen from the batter side is located on the straight line $L_1$ and the predetermined rotation direction $R_{XY}$ (the rightward rotation direction or the leftward rotation direction) about the straight line $L_1$ when the two-dimensional coordinates $(x_1, y_1)$ are seen from the origin (0, 0) is the rotation direction of the ball seen from the batter side. The example in FIG. 8A is an example of a case where the predetermined rotation direction $R_{XY}$ is the rightward rotation direction, and in this case, the side of the direction which the middle finger tip faces in a case where the little finger side of the right hand is arranged on the side of the origin (0, 0) and the thumb side is arranged on the side of the two-dimensional coordinates $(x_1, y_1)$ is the rotation direction of the ball seen from the batter side. On the other hand, if the predetermined rotation direction $R_{XY}$ is the leftward rotation direction, the side of the direction which the middle finger tip faces in a case where the little finger side of the left hand is arranged on the side of the origin (0, 0) and the thumb side is arranged on the side of the two-dimensional coordinates $(x_1, y_1)$ is the rotation direction of the ball seen from the batter side. Note that the two-dimensional coordinate system displayed on the display unit 1201 is an orthogonal coordinate system including an X axis and a Y axis. The X axis in this example is an axis of the horizontal direction seen from the batter side (a substantially horizontal left-right direction; a left-right direction that is substantially parallel with the ground), and the Y axis is an axis in the longitudinal direction seen from the batter side (an up-down direction that is substantially vertical; an up-down direction that is substantially orthogonal to the ground). Also, the display unit 1201 according to the present embodiment simultaneously displays motion information in regard to pitching performed a plurality of times (information in regard to pitching performed a plurality of times) in different display forms in accordance with how large the amounts of rotation of the balls are. In other words, the display form of the mark arranged at the two-dimensional coordinates $(x_1, y_1)$ on the display unit 1201 differs depending on how large the amount of the rotation of the ball is. There is no limit in the mark display forms in accordance with how large the amount of the rotation of the ball is. For example, saturation of the mark may differ, luminance may differ, a symbol may differ, a shape may differ, or a size may differ depending on how large the amount of rotation of the ball is. There is also no limitation in types of the display forms of the mark in accordance with how large the amount of the rotation of the ball is. For example, there may be two types, or there may be three or more types of display forms for the mark. Alternatively, saturation and illuminance of the mark may continuously differ in accordance with how large the amount of rotation of the ball is. In the present embodiment, an example in which the amounts of rotation of the balls are categorized into three types and marks in three types of display forms in accordance with the categories are displayed will be described. In other words, a rotation axis of a ball belonging to the section of the largest amount of rotation is represented by a framed white square mark, a rotation axis of a ball belonging to a section of the smallest amount of rotation is represented by a solid black square mark, and a rotation axis of a ball belonging to a section of a middle amount of rotation is represented by a square mark with a cross. However, this does not limit the present invention. In FIG. 8A, one rotation axis of a ball seen from the batter side in regard to each of ball types, namely curve, slider, change-up, and FB thrown by a right-handed pitcher is illustrated. In this manner, the rotation axis and the amount of rotation of the ball differs depending on the ball type. Details thereof will be described later.

Figure 8B:
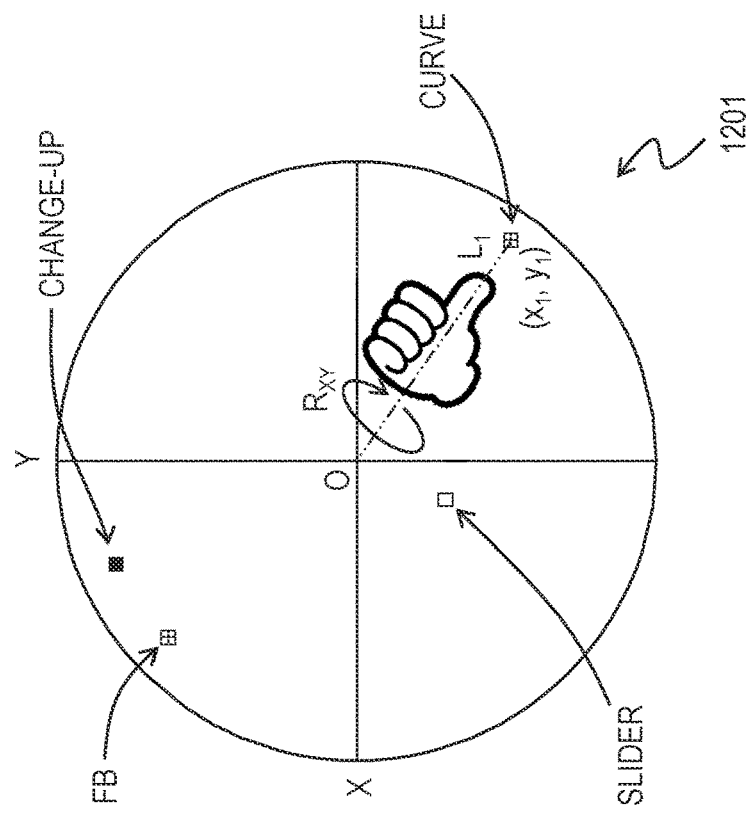
FIG. 8B is a diagram illustrating, as an example, a state where the rotation axis of the ball seen from right above the ball in regard to pitching is visually displayed.
Figure 9A:
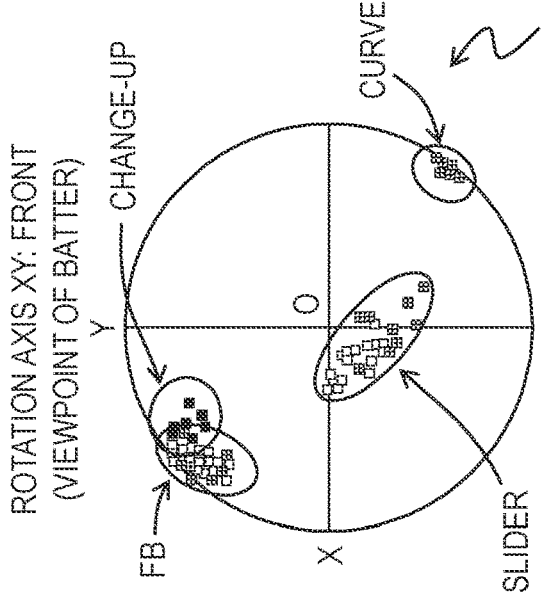
FIG. 9A is a diagram illustrating, as an example, a state where the amount of change in trajectory of a ball, from which an influence of gravity is removed, which is seen from the pitcher side, is visually displayed.
Figure 9B:
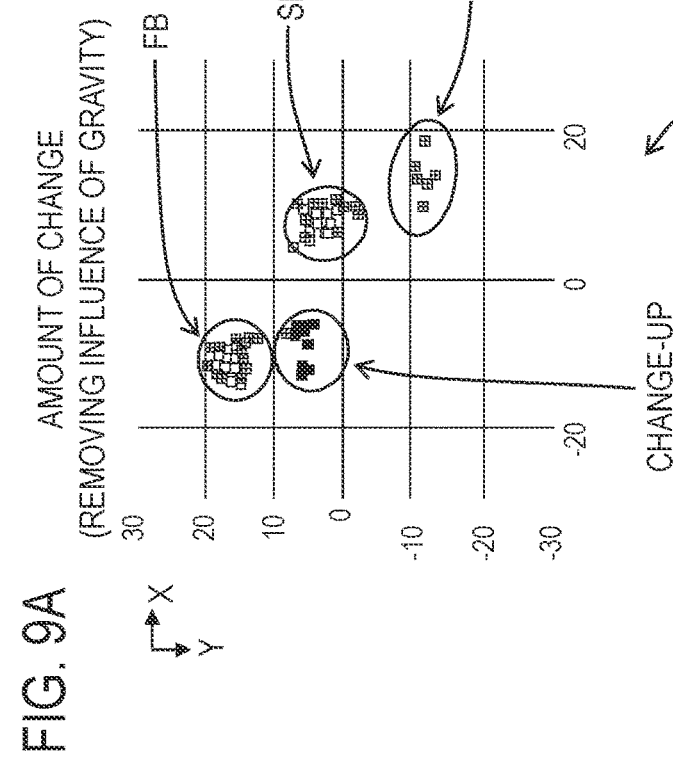
FIG. 9B is a diagram illustrating, as an example, a state where a rotation axis of the ball seen from the batter side in regard to pitching is visually displayed.
Figure 9C:
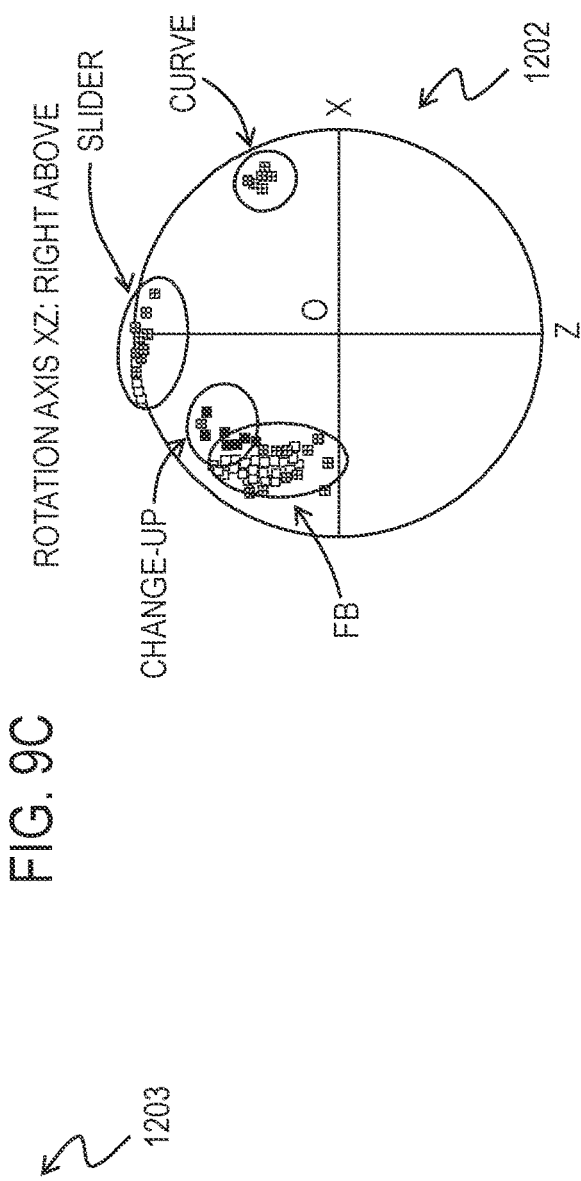
FIG. 9C is a diagram illustrating, as an example, a state where the rotation axis of the ball seen from right above the ball in regard to pitching is visually displayed.
Figure 10B:
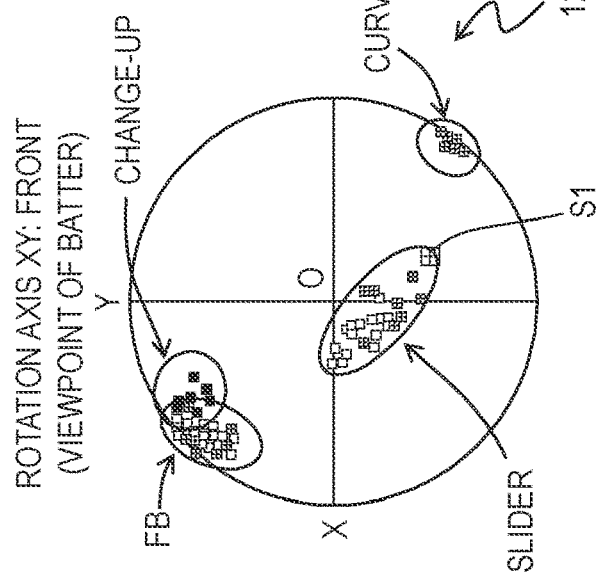
FIG. 10B is a diagram illustrating, as an example, a state where a rotation axis of the ball seen from the batter side in regard to pitching is visually displayed.
Figure 10C:
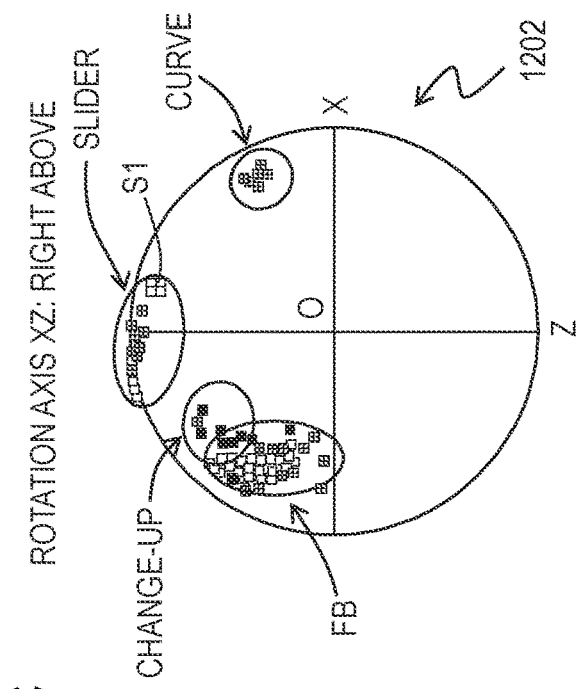
FIG. 10C is a diagram illustrating, as an example, a state where the rotation axis of the ball seen from right above the ball in regard to pitching is visually displayed.
Figure 10A:
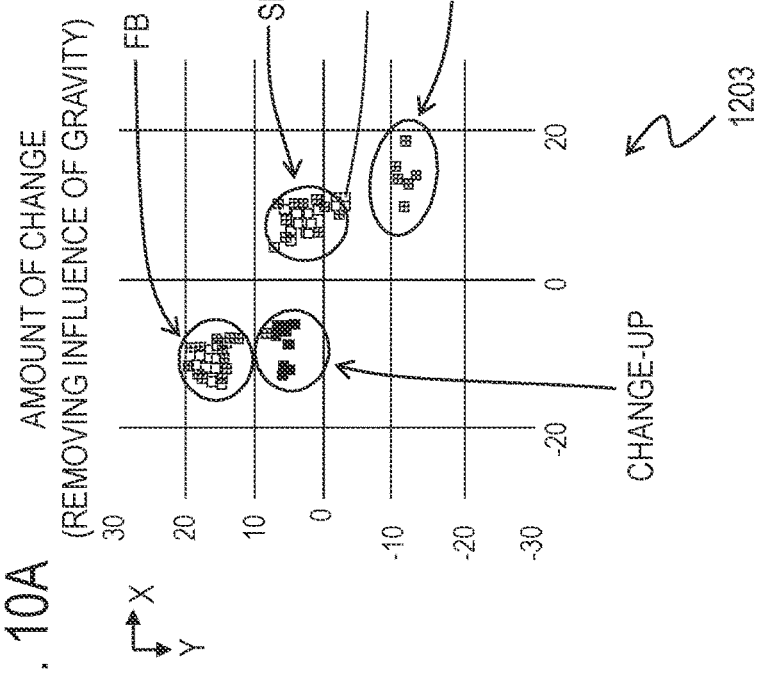
FIG. 10A is a diagram illustrating, as an example, a state where the amount of change in trajectory of a ball, from which an influence of gravity is removed, which is seen from the pitcher side, is visually displayed.

The display unit 1202 is a region where the rotation axis of the ball seen from above the ball is displayed in regard to the aforementioned pitching performed each time. In the present embodiment, an example in which the rotation axis of the ball seen from above the ball in pitching performed each time is displayed with a mark arranged at the two-dimensional coordinates (X, Z) $(x_2, z_2)$ in the two-dimensional coordinate system seen from above the ball will be described. In other words, the mark is displayed at the two-dimensional coordinates $(x_2, z_2)$ at which the rotation axis of the ball seen from above the ball is located on the straight line $L_2$ passing through the two-dimensional coordinates $(x_2, z_2)$ and the origin (0, 0) in this example, and the rotation axis of the ball seen from above the ball in pitching performed each time is thereby represented as illustrated as an example in FIG. 8B. Preferably, the mark is displayed at the two-dimensional coordinates $(x_2, z_2)$ at which the rotation axis of the ball seen from above the ball is located on the straight line $L_2$ and the predetermined rotation direction $R_{XZ}$ (the rightward rotation direction or the leftward rotation direction) about the straight line $L_2$ when the two-dimensional coordinates $(x_2, z_2)$ are seen from the origin (0, 0) is the rotation direction of the ball seen from above the ball. The example in FIG. 8B is an example of a case where the predetermined rotation direction $R_{XZ}$ is the rightward rotation direction, and in this case, the side of the direction which the middle finger tip faces in a case where the little finger side of the right hand is arranged on the side of the origin (0, 0) and the thumb side is arranged on the side of the two-dimensional coordinates $(x_2, z_2)$ is the rotation direction of the ball seen from above the ball. On the other hand, if the predetermined rotation direction $RR_{XZ}$ is the leftward rotation direction, the side of the direction which the middle finger faces in a case where the little finger side of the left hand is arranged on the side of the origin (0, 0) and the thumb side is arranged on the side of the two-dimensional coordinates $(x_2, z_2)$ is the rotation direction of the ball seen from above the ball. Note that the two-dimensional coordinate system displayed on the display unit 1202 is an orthogonal coordinate system including an X axis and a Z axis. The X axis in this example is the same as the X axis on the display unit 1201, and the Z axis is an axis in the longitudinal direction (a direction that is substantially parallel with a virtual straight line connecting the pitcher side to the batter side) seen from above the ball. Also, the display unit 1202 according to the present embodiment simultaneously displays motion information in regard to pitching performed a plurality of times (information in regard to pitching performed a plurality of times) in different display forms in accordance with how large the amounts of rotation of the balls are. In other words, the display form of the mark arranged at the two-dimensional coordinates $(x_2, z_2)$ on the display unit 1202 differs depending on how large the amount of the rotation of the ball is. Specific examples of the display form of the mark are the same as those of the display unit 1201. In FIG. 8B, one rotation axis of a ball seen from above the ball in regard to each of ball types, namely curve, slider, change-up, and FB thrown by a right-handed pitcher is illustrated. In this manner, the rotation axis and the amount of rotation of the ball differs depending on the ball type. Details thereof will be described later.

The display unit 1203 is a region where the amount of change in trajectory of the ball, from which an influence of gravity has been removed, which is seen from the pitcher side is displayed in regard to the aforementioned pitching performed each time. In other words, the display unit 1203 displays the amount of change in trajectory of the ball obtained by removing the influence of gravity from the amount of change in trajectory of the ball when the thrown ball reaches the batter side. In the present embodiment, the amount of change in trajectory of the ball, from which the influence of gravity has been removed, which is seen from the pitcher side is displayed with a mark arranged at the two-dimensional coordinates (X, Y) $(x_5, y_5)$ representing the relative arrival position, from which the influence of gravity has been removed. The two-dimensional coordinates $(x_5, y_5)$ in this example are on the assumption that the assumed arrival position is the origin (0, 0) of the two-dimensional coordinate system. The X axis and the Y axis in this example are the same as the X axis and the Y axis of the display unit 1201. Also, the display form of the mark arranged at the two-dimensional coordinates $(x_3, y_3)$ on the display unit 1204 also differs depending on how large the amount of rotation of the ball is. Specific examples of the display form of the mark are the same as those of the display unit 1201.

The display unit 1204 is a region where the amount of change in trajectory of the ball (including the influence of gravity) seen from the pitcher side is displayed in regard to the aforementioned pitching performed each time. In other words, the display unit 1204 displays the amount of change in trajectory of the ball until the thrown ball reaches the batter side. In the present embodiment, an example in which the amount of change in trajectory of the ball seen from the pitcher side is displayed with a mark arranged at the two-dimensional coordinates (X, Y) $(x_3, y_3)$ representing the relative arrival position in the two-dimensional coordinate system of the ball seen from the pitcher side will be described. The two-dimensional coordinates $(x_3, y_3)$ in this example are on the assumption that the assumed arrival position is the origin (0, 0) of the two-dimensional coordinate system. The X axis and the Y axis in this example are the same as the X axis and the Y axis of the display unit 1201. Also, the display form of the mark arranged at the two-dimensional coordinates $(x_3, y_3)$ on the display unit 1204 also differs depending on how large the amount of rotation of the ball is. Specific examples of the display form of the mark are the same as those of the display unit 1201.

The display unit 1205 is a region where the position through which the thrown ball has passed on the batter side (above home base, for example) is displayed in regard to the aforementioned pitching performed each time. In the present embodiment, the position through which the thrown ball in pitching performed each time has passed on the batter side is displayed with a mark arranged at the two-dimensional coordinates (X, Y)=($x_4$, $y_4$) representing the position through which the ball has passed on the batter side in the two-dimensional coordinate system of the ball seen from the batter side. The X axis and the Y axis in this example are the same as the X axis and the Y axis of the display unit 1201. Also, the display form of the mark arranged at the two-dimensional coordinates ($x_4$, $y_4$) on the display unit 1205 also differs depending on how large the amount of rotation of the ball is. Specific examples of the display form of the mark are the same as those of the display unit 1201.

The display unit 1206 is a region where a rotation axis A and a rotation direction R of a ball in selected one pitching are displayed by a 3D figure video (animation) of the ball. In other words, the display unit 1206 displays a 3D figure video representing how the ball in the selected pitching rotates. The 3D figure video represents how the ball rotates about the rotation axis A in the rotation direction R.

The search sections 1301, ..., 1307 are sections for inputting search conditions for searching for a pitching video. A user can input a search condition to each of the search sections 1301, ..., 1307 from the input unit 103 of the motion information output device 10 (FIG. 1). It is possible to input a range of the imaging date and time of the pitching video to the search sections 1301 and 1302. In other words, it is possible to input a start timing of the range of the imaging date and time to the search section 1301 and to input an end timing of the range of the imaging date and time to the search section 1302. An inning when the pitching was performed can be input to the search section 1303. A pitcher who performed the pitching can be input to the search section 1304. It is possible to input an arbitrary search word to the search section 1305, and it is possible to designate which of OR search and AND search is to be performed for the search word input to the search section 1305 in the search sections 1306 and 1307.

<<Search Processing and Display>>

If search conditions are input to the search sections 1301, ..., 1307, the search conditions are sent to the display control unit 104 of the motion information output device 10 (FIG. 1). The display control unit 104 performs searching in the storage unit 101 on the basis of the input search conditions, extracts pitching attributes that meet the search conditions, information for displaying motion information in regard to pitching performed each time and associated with the pitching attributes, and a pitching video, and outputs them to the display device 11. In a case where search conditions for extracting only pitching of a specific ball type (only curve, for example) are input, for example, the display control unit 104 extracts information for simultaneously displaying a plurality of pieces of information (information for displaying motion information) in regard to the specific ball type designated by the search conditions out of information (information for displaying motion information) in regard to pitching performed a plurality of times and pitching attributes and pitching videos corresponding thereto and outputs them to the display device 11. In a case where search conditions for extracting only pitching performed by a specific pitcher (same pitcher) are input, for example, the display control unit 104 extracts information for simultaneously displaying a plurality of pieces of information (information for displaying motion information) in regard to the specific pitcher (same pitcher) designated by the search conditions out of information (information for displaying motion information) in regard to pitching performed a plurality of times and pitching attributes and pitching videos corresponding thereto and outputs them to the display device 11. In a case where search conditions for extracting only pitching of a specific ball type thrown by a specific pitcher (same pitcher) are input, for example, the display control unit 104 extracts information for simultaneously displaying a plurality of pieces of information (information for displaying motion information) in regard to the specific pitcher (same pitcher) and the specific ball type designated by the search conditions out of information (information for displaying motion information) in regard to pitching performed a plurality of times and pitching attributes and pitching videos corresponding thereto and outputs them to the display device 11. Alternatively, the display control unit 104 may extract information for simultaneously displaying information (information for displaying motion information) in regard to pitching performed a plurality of times in display forms that are different depending on ball types and pitching attributes and pitching videos corresponding thereto and output them to the display device 11. For example, the pitching attribute may include information regarding ball types of thrown pitch, and the information for displaying motion information may include information for designating the display form (for example, display of marks with shapes that are different depending on ball types, such as a square mark for curve, a triangle mark for slider, a diamond mark for change-up, and a circle mark for FB, for example; marks with saturations that are different depending on ball types, such as a red mark for curve, a blue mark for slider, a yellow mark for change-up, and a green mark for FB) of each ball type. In a case where the display form of each ball type is determined in advance, the information for displaying motion information may not include information for designating the display form of each ball type.

The display device 11 displays, on each of the display units 1201, ..., 1205, the information for displaying motion information corresponding to send information, that is, "the rotation axis of the ball seen from the batter side", "the rotation axis of the ball seen from above the ball", "the amounts of change in trajectory of the ball, from which the influence of gravity has been removed, which is seen from the pitcher side", "the amount of change in trajectory of the ball seen from the pitcher side (including the influence of gravity)", and "the position through which the thrown ball has passed on the batter side (above home base, for example)" as described above. In other words, the display units 1201, ..., 1205 display marks representing "the rotation axis of the ball seen from the batter side", "the rotation axis of the ball seen from above the ball", "the amounts of change in trajectory of the ball, from which the influence of gravity has been removed, which is seen from the pitcher side", "the amount of change in trajectory of the ball seen from the pitcher side (including the influence of gravity)", and "the position through which the thrown ball has passed on the batter side (above home base, for example)" in regard to the pitching performed each time and meeting the search conditions, respectively. In a case where information for displaying motion information in regard to only pitching of a specific ball type is sent, for example, the display device 11 simultaneously displays, on each of the display units 1201, ..., 1205, a plurality of pieces of information (information for displaying motion information) in regard to the specific ball type out of information (information for displaying motion information) in regard to pitching performed a plurality of times. In a case where information for displaying motion information in regard to only pitching performed by a specific pitcher (same pitcher) is sent, for example, the display device 11 simultaneously displays, on each of the display units 1201, ..., 1205, a plurality of pieces of information (information for displaying motion information) in regard to the specific pitcher (same pitcher) out of information (information for displaying motion information) in regard to pitching performed a plurality of times. In a case where information for displaying motion information in regard to only pitching of a specific ball type thrown by a specific pitcher (same pitcher) is sent, for example, the display device 11 displays, on each of the display units 1201, . . . , 1205, information for simultaneously displaying a plurality of pieces of information (information for displaying motion information) in regard to the specific pitcher (same pitcher) and the specific ball type out of information (information for displaying motion information) in regard to pitching performed a plurality of times. Alternatively, the display device 11 may simultaneously display, on each of the display units 1201, . . . , 1205, information (information for displaying motion information) in regard to pitching performed a plurality of types in display forms that are different depending on ball types, for example. For example, the display device 11 may display a square mark for curve, a triangle mark for slider, a diamond mark for change-up, and a circle mark for FB. The marks may further be displayed in display forms that are different in accordance with the amounts of rotation of the balls in this case as well. For example, a rotation axis of a ball belonging to the section of the largest amount of rotation may be represented by a framed white mark, a rotation axis of a ball belonging to the section of the smallest amount of rotation may be represented by a solid black mark, and a rotation axis of a ball belonging to the section of the intermediate amount of rotation may be displayed by a mark with a cross.

The user can select an arbitrary mark displayed on the display units 1201, . . . , 1206 through input processing (clicking or tapping, for example) from the input unit 103 and thereby select specific pitching. If specific pitching is selected by selecting a specific mark displayed on any of the display units 1201, . . . , 1206 as illustrated as an example in FIG. 2, the mark M corresponding to the selected pitching is displayed on all the display units 1201 to 1206 in a display form that is different from marks corresponding to another pitching. In the example in FIG. 2, each mark M corresponding to the selected pitching is displayed to be larger than the marks corresponding to another pitching. However, this does not limit the present invention, and for example, each mark M corresponding to the selected pitching may be displayed as a mark with a shape that is different from those of the marks corresponding to another pitching, may be displayed as marks with a different color, may be displayed as a mark with a different color and a different shape, or may be displayed as a mark with a different color and a different size. In other words, a plurality of marks (information for displaying motion information) in regard to the selected specific pitching out of marks (information for displaying motion information) in regard to the pitching performed a plurality of times are simultaneously displayed in a display form that is different from those of the marks (information for displaying motion information) for another pitching.

Figure 3:
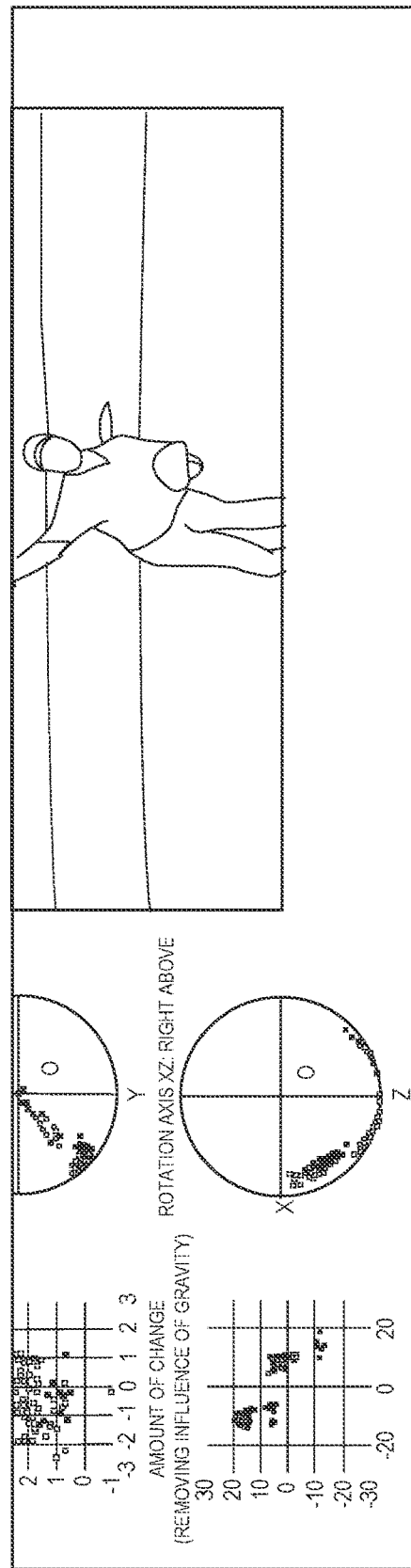
FIG. 3 is a diagram illustrating, as an example, a user interface screen displayed on the basis of information output from the motion information output device according to the embodiment.

Also, as illustrated as an example in FIG. 3, the display device 11 also displays a search result section 1130 that displays a record that is text information regarding pitching performed each time and that matches the search conditions. The search result section 1130 illustrated as an example in FIG. 3 includes a selection section 1131, a comment section 1132, an evaluation section 1133, and a search result list 1134. The selection section 1131 is a selection section for selecting a specific record. The comment section 1132 and the evaluation section 1133 are sections for inputting a comment and evaluation (good/bad) for the pitching of each record, respectively. The search result list 1134 is a section for displaying text information of each record. The text information of each record is obtained from at least any one of the pitching attribute sent from the motion information output device 10 as described above and information for displaying motion information in regard to pitching performed each time, for example. In the search result list 1134 illustrated as an example in FIG. 3, sections of "Date", "Time", and "Inning" representing pitching date and time, imaging date and time, and an inning, "Pitcher" representing a pitcher, "Batter" representing a batter, "axis_x", "axis_y", "axis_z", and "theta" representing a direction of a rotation axis of a ball, "rpm" representing the amount of rotation of the ball, and the like are displayed for each record. The user can select a specific record through input processing (clicking or tapping, for example) from the input unit 103 to the selection section 1131 and thereby select specific pitching in this manner as well. In this manner, a mark M corresponding to the selected pitching is displayed in a display form that is different from those of marks corresponding to another pitching in all the display units 1201, . . . , 1206 as described above (FIG. 2). Also, the user can input a comment and an evaluation result for pitching performed each time through inputs from the input unit 103 to the comment section 1132 and the evaluation section 1133. The input comment and evaluation result are sent to the evaluation recording unit 105 of the motion information output device 10 (FIG. 1), and the evaluation recording unit 105 records the input comment and evaluation result as pitching attributes of the pitching corresponding thereto in the storage unit 101.

If specific pitching is selected through selection of a mark in the display units 1201, . . . , 1206 or input processing to the selection section 1131, the display unit 1206 displays the rotation axis A and the rotation direction R of the one ball in the selected pitching as a 3D figure video of the ball (FIG. 2). In a case where pitching performed a plurality of times is selected, a 3D figure video of one ball in the finally selected pitching, for example, is displayed on the display unit 1206.

Figure 4:
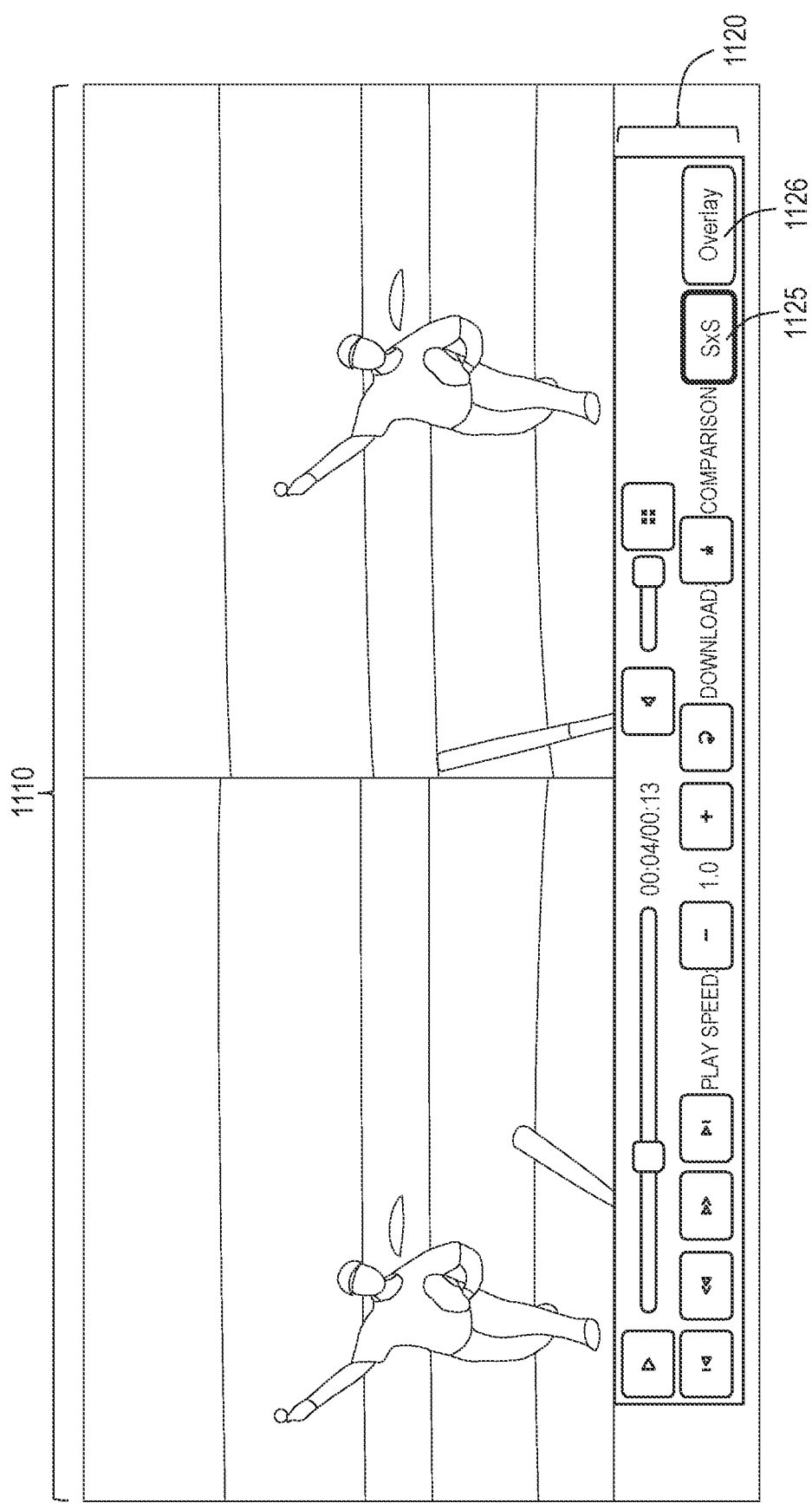
FIG. 4 is a diagram illustrating, as an example, a user interface screen displayed on the basis of information output from the motion information output device according to the embodiment.
Figure 5:
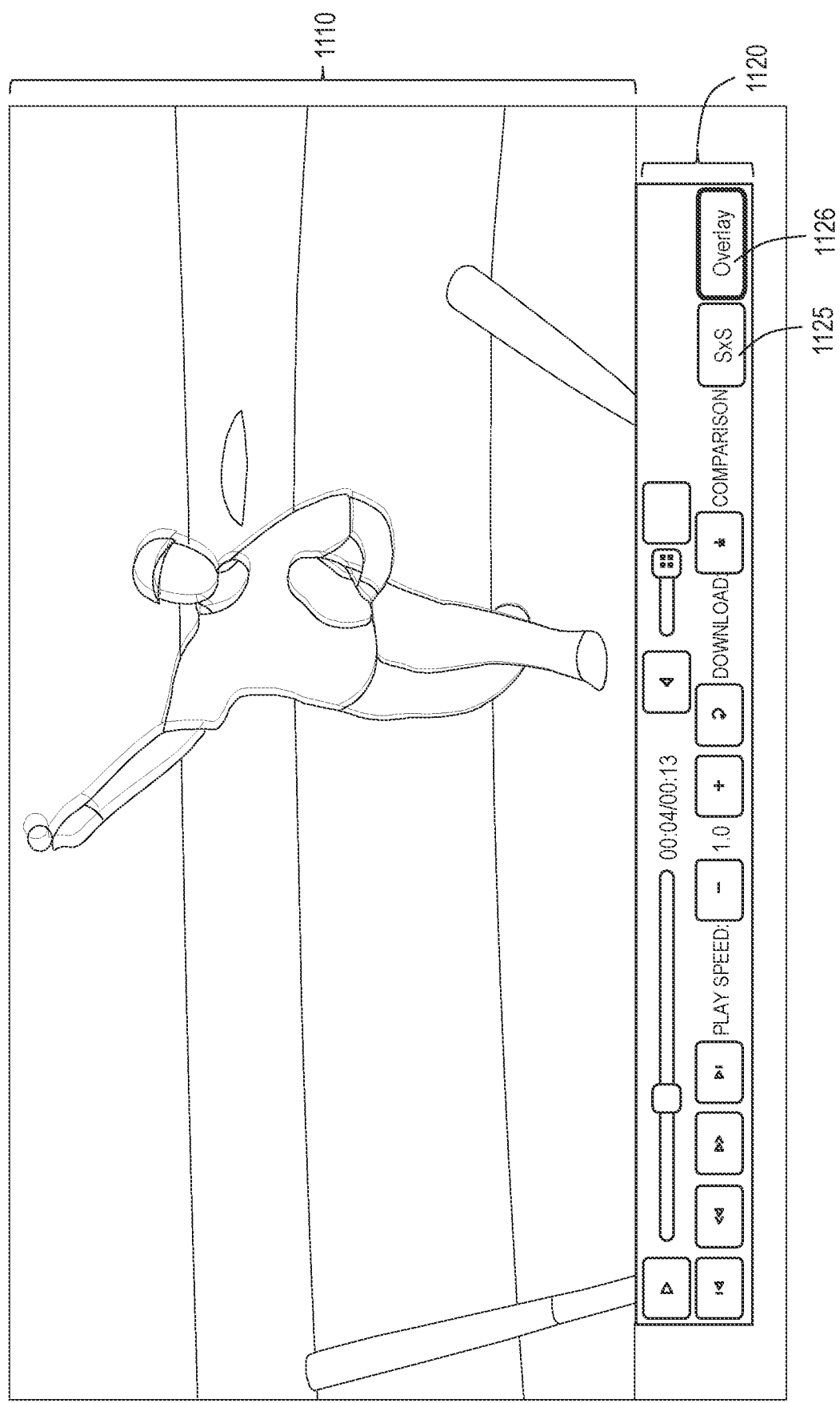
FIG. 5 is a diagram illustrating, as an example, a user interface screen displayed on the basis of information output from the motion information output device according to the embodiment.
Figure 6:
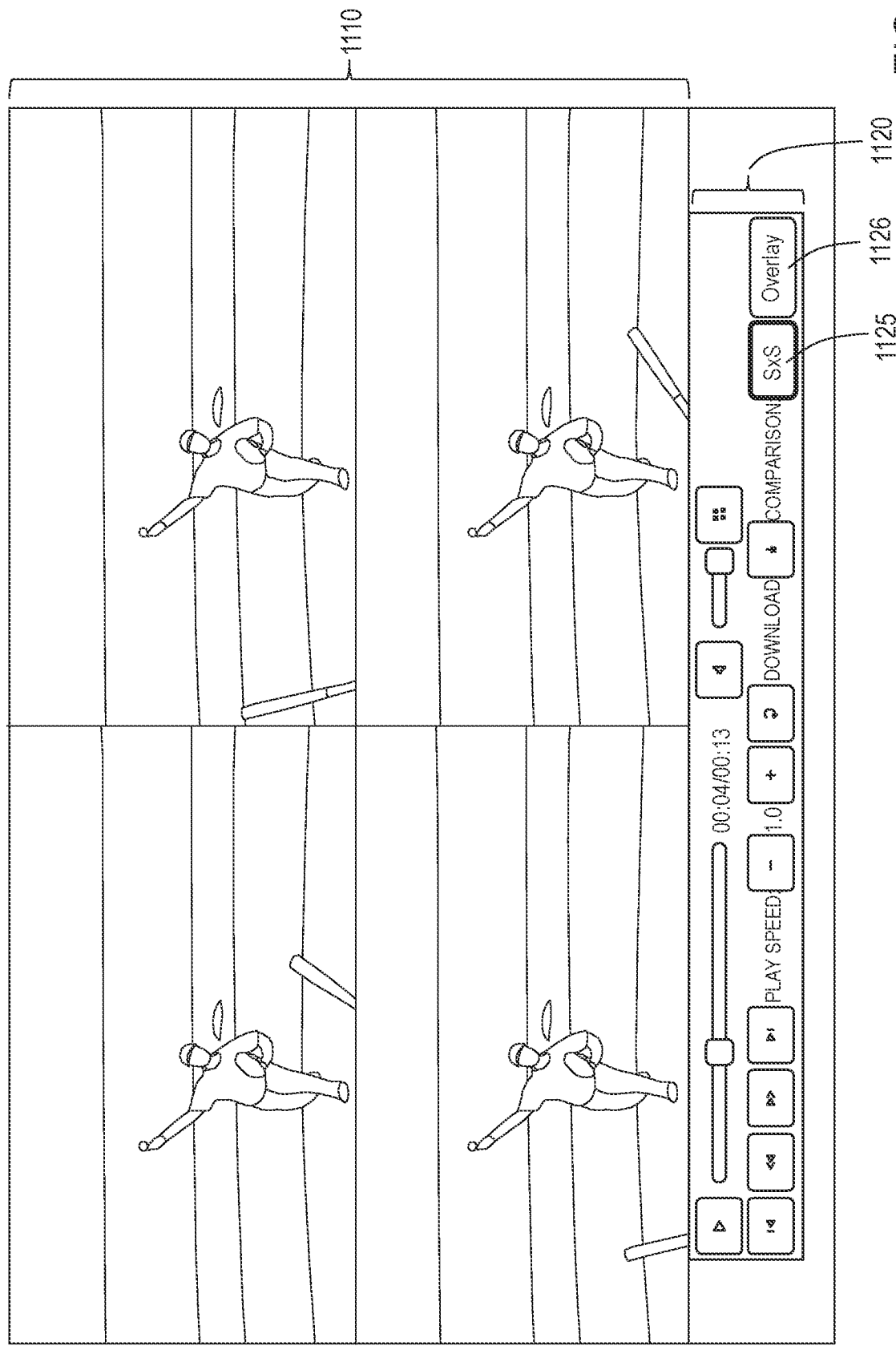
FIG. 6 is a diagram illustrating, as an example, a user interface screen displayed on the basis of information output from the motion information output device according to the embodiment.
Figure 7:
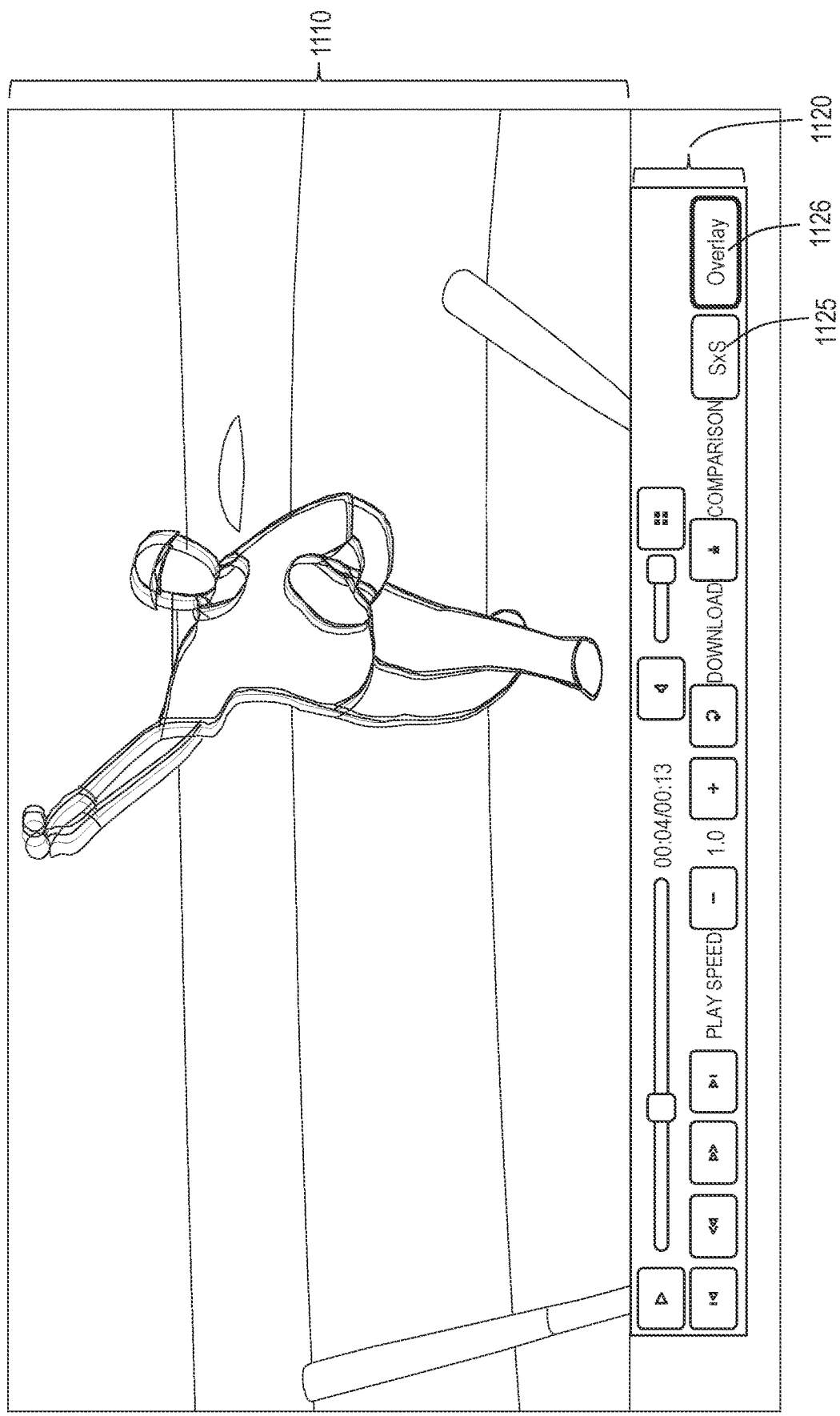
FIG. 7 is a diagram illustrating, as an example, a user interface screen displayed on the basis of information output from the motion information output device according to the embodiment.

Furthermore, the pitching video of the pitching selected as described above is displayed on the projection video display unit 1110 of the pitching video display unit 1100 (FIG. 2). The displayed pitching video can be operated by the play operation unit 1121, the volume operation unit 1122, and the display selection unit 1123 and can be downloaded by the download operation unit 1124. In a case where pitching videos of pitching performed a plurality of times are selected, it is possible to select whether to display the plurality of pitching videos in an aligned manner or whether to display them in an overlapping manner by operating (clicking or tapping, for example) the side-by-side comparison selection unit 1125 or the overlapping selection unit 1126 through input processing from the input unit 103 (FIG. 1). In a case where two pitching videos are selected, and an operation is performed on the side-by-side comparison selection unit 1125, for example, the two selected pitching videos are displayed in an aligned manner on the pitching video display unit 1100 as illustrated as an example in FIG. 4. On the other hand, in a case where two pitching videos are selected, and an operation is performed on the overlapping selection unit 1126, for example, the two selected pitching videos are displayed in an overlapping manner on the pitching video display unit 1100 as illustrated as an example in FIG. 5. Also, in a case where four pitching videos are selected, and an operation is performed on the side-by-side comparison selection unit 1125, the four selected pitching videos are displayed in an aligned manner on the pitching video display unit 1100 as illustrated as an example in FIG. 6. On the other hand, in a case where four pitching videos are selected, and an operation is performed on the overlapping selection unit 1126, the four selected pitching videos are displayed in an overlapping manner on the pitching video display unit 1100 as illustrated as an example in FIG. 7. It is possible to compare the pitching in these plurality of pitching videos by playing the plurality of pitching videos in such a state. Also, if specific pitching is selected as described above, the mark M corresponding to the selected pitching is displayed in a display form that is different from marks corresponding to another pitching in all the display units 1201, . . . , 1206 (FIG. 2). The same applies to a case where pitching performed a plurality of times is selected. Therefore, the user can compare motion information regarding the pitching performed the plurality of times on the display units 1201, . . . , 1206 while comparing the pitching in the plurality of pitching videos selected on the pitching video display unit 1100.

<<Relationship Between Display on Display Units 1201, 1201, and 1203 and Ball Types>>

Figure 11B:
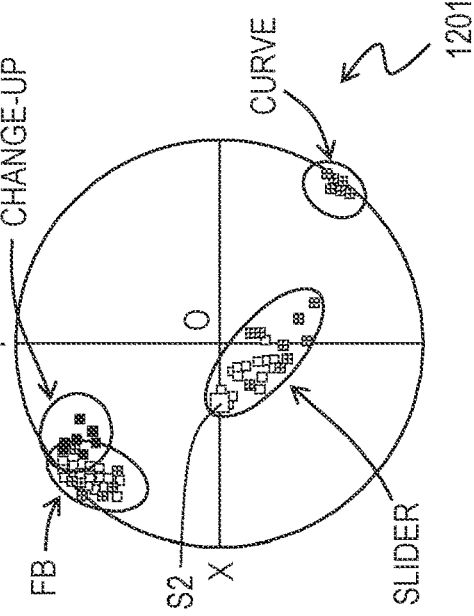
FIG. 11B is a diagram illustrating, as an example, a state where a rotation axis of the ball seen from the batter side in regard to pitching is visually displayed.
Figure 11C:
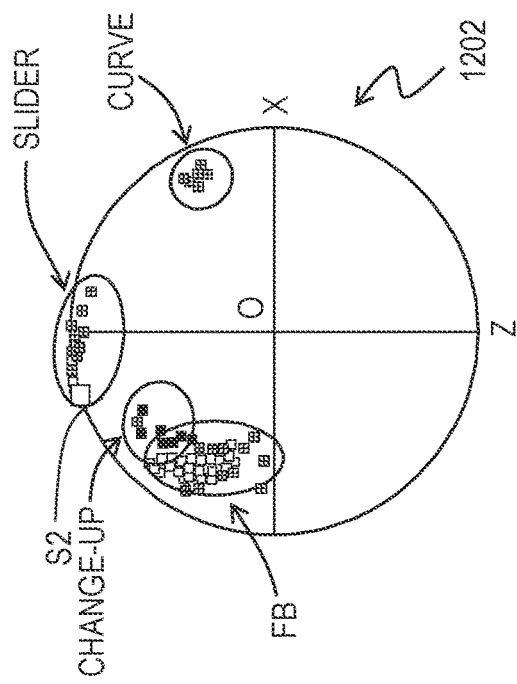
FIG. 11C is a diagram illustrating, as an example, a state where the rotation axis of the ball seen from right above the ball in regard to pitching is visually displayed.
Figure 11A:
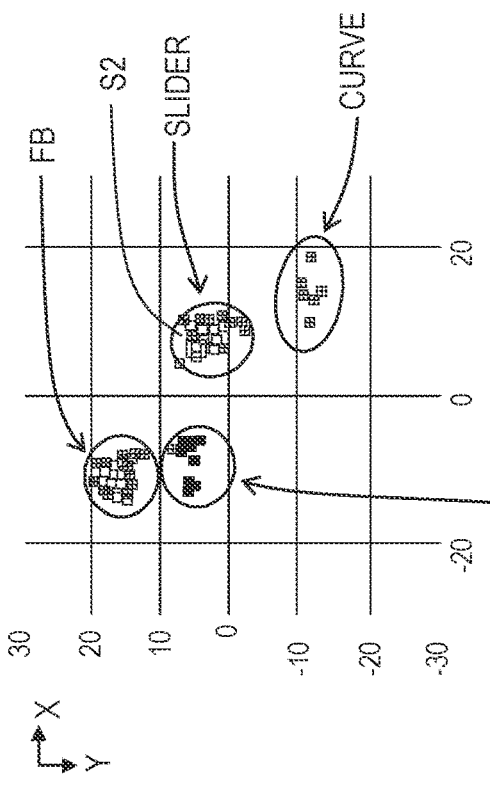
FIG. 11A is a diagram illustrating, as an example, a state where the amount of change in trajectory of a ball, from which an influence of gravity is removed, which is seen from the pitcher side, is visually displayed.
Figure 12B:
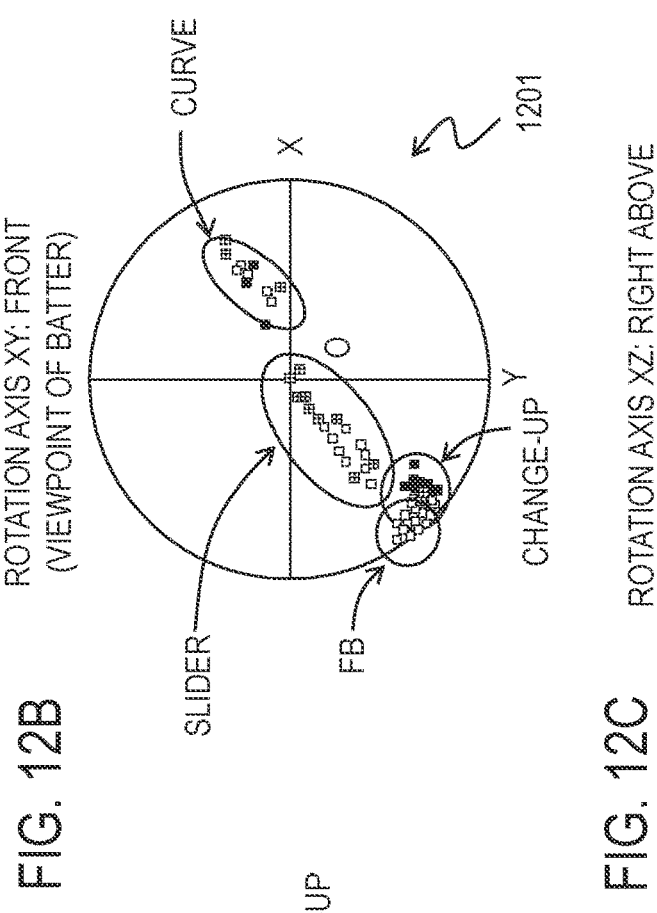
FIG. 12B is a diagram illustrating, as an example, a state where a rotation axis of the ball seen from the batter side in regard to pitching is visually displayed.
Figure 12C:
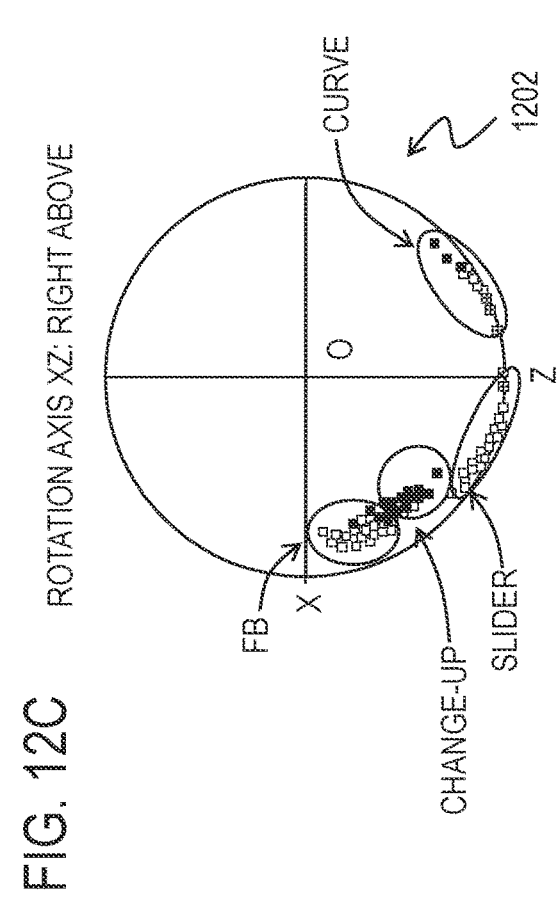
FIG. 12C is a diagram illustrating, as an example, a state where the rotation axis of the ball seen from right above the ball in regard to pitching is visually displayed.
Figure 12A:
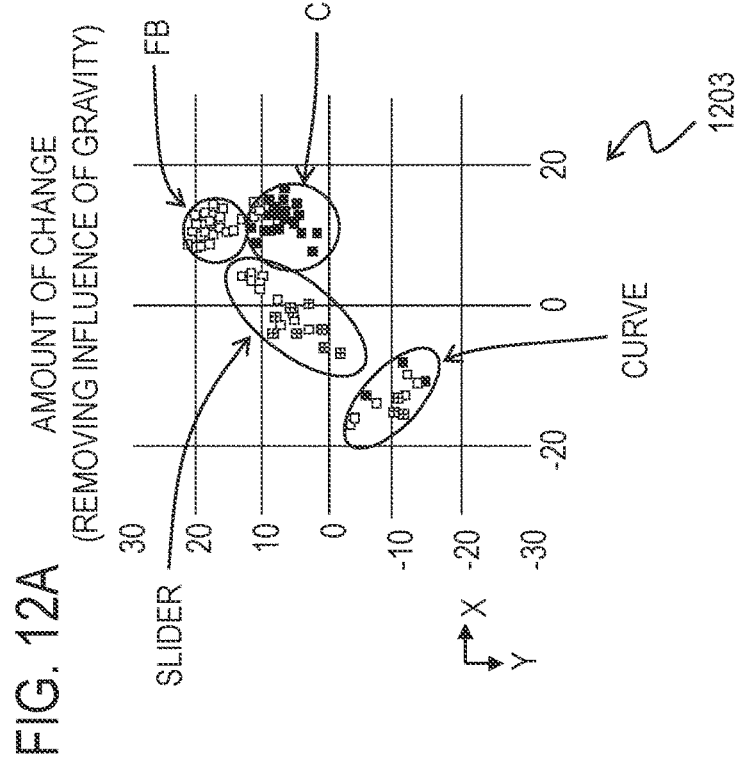
FIG. 12A is a diagram illustrating, as an example, a state where the amount of change in trajectory of a ball, from which an influence of gravity is removed, which is seen from the pitcher side, is visually displayed.
Figure 13A:
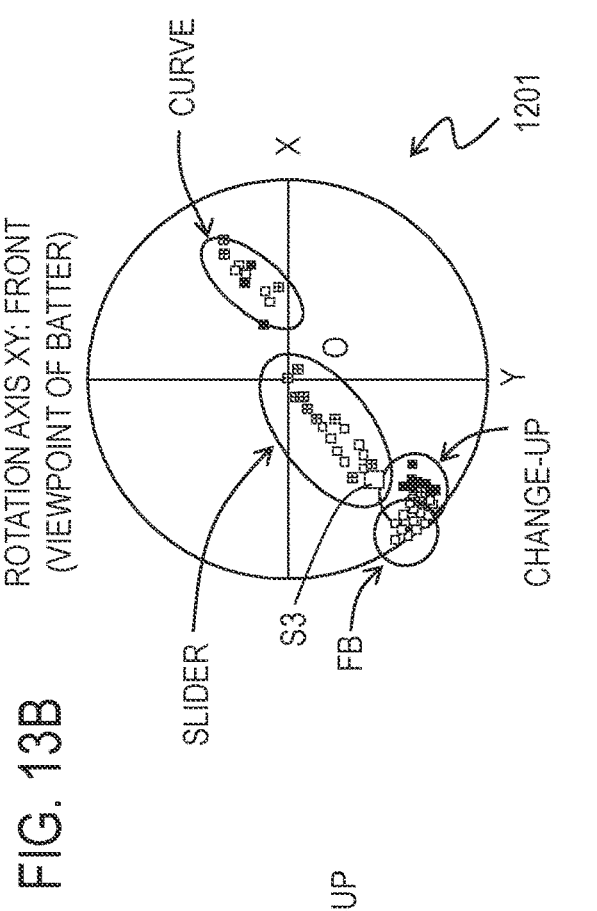
FIG. 13A is a diagram illustrating, as an example, a state where the amount of change in trajectory of a ball, from which an influence of gravity is removed, which is seen from the pitcher side, is visually displayed.
Figure 13B:
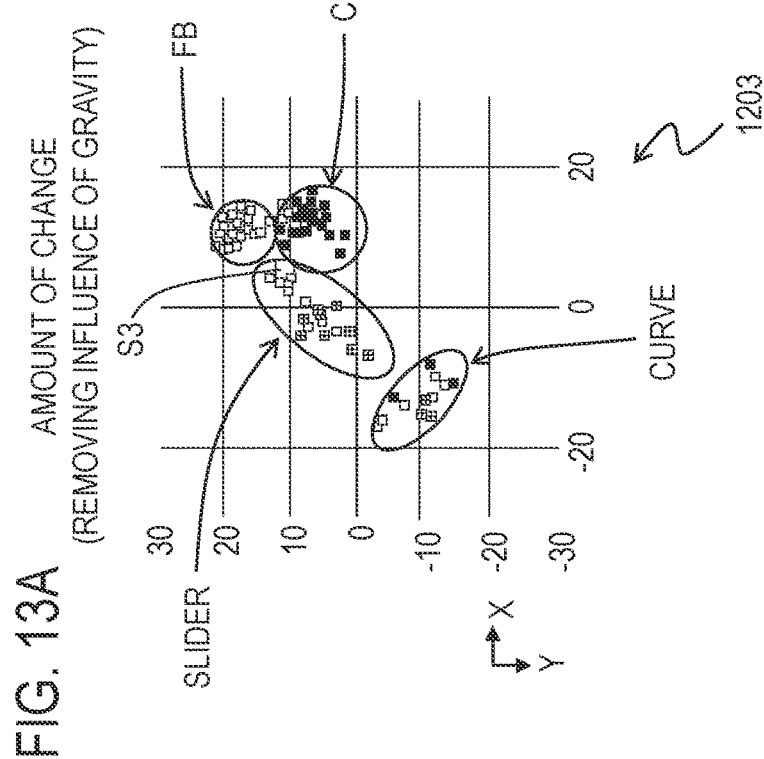
FIG. 13B is a diagram illustrating, as an example, a state where a rotation axis of the ball seen from the batter side in regard to pitching is visually displayed.
Figure 13C:
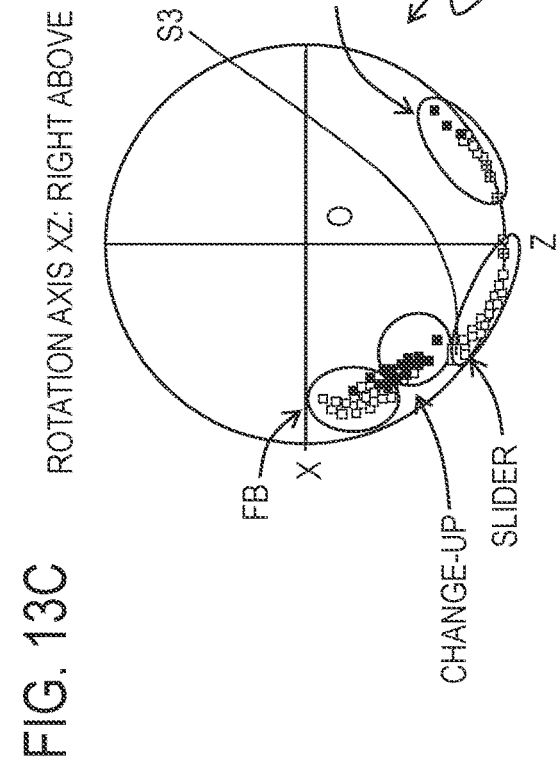
FIG. 13C is a diagram illustrating, as an example, a state where the rotation axis of the ball seen from right above the ball in regard to pitching is visually displayed.
Figure 14B:
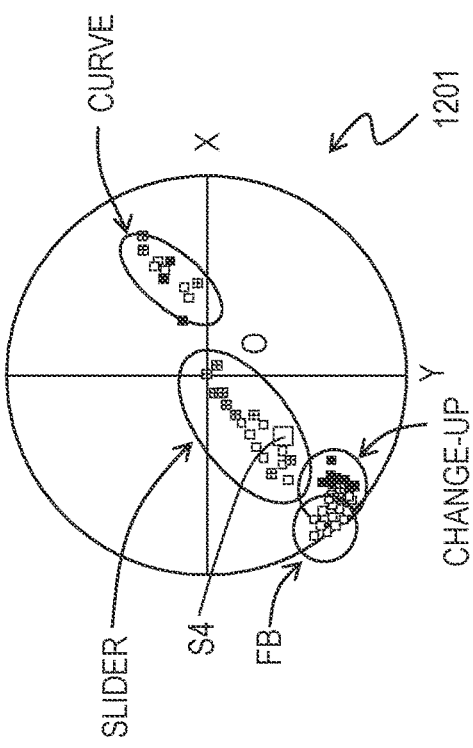
FIG. 14B is a diagram illustrating, as an example, a state where a rotation axis of the ball seen from the batter side in regard to pitching is visually displayed.
Figure 14C:
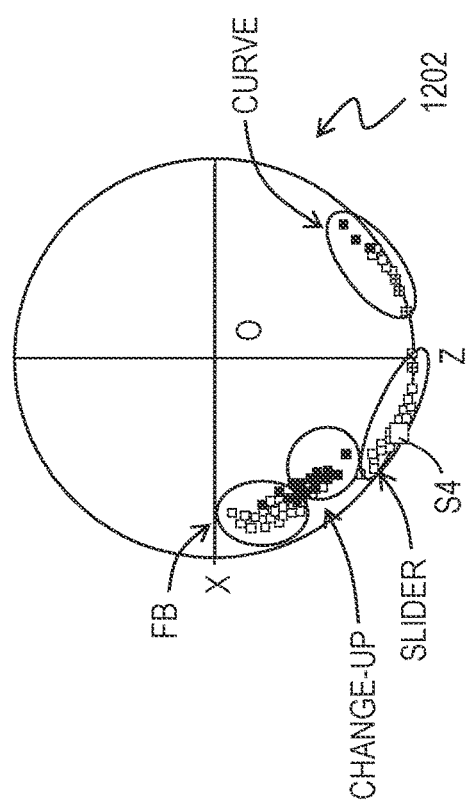
FIG. 14C is a diagram illustrating, as an example, a state where the rotation axis of the ball seen from right above the ball in regard to pitching is visually displayed.
Figure 14A:
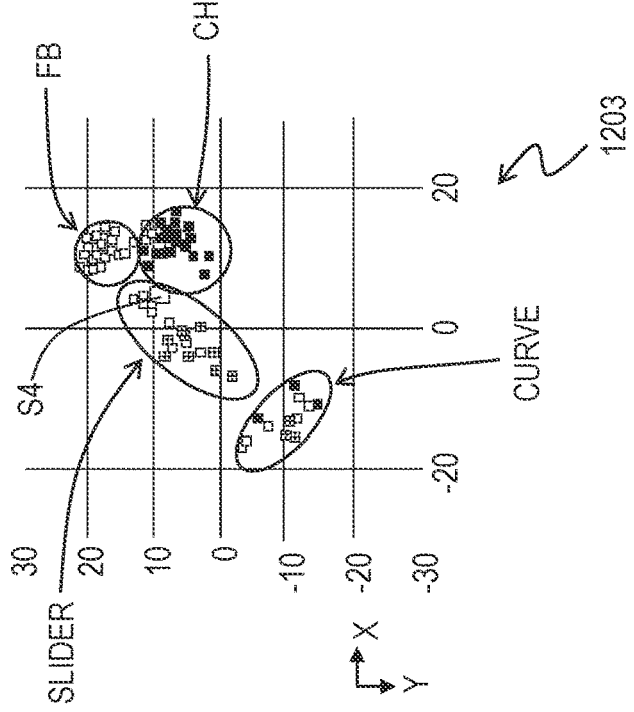
FIG. 14A is a diagram illustrating, as an example, a state where the amount of change in trajectory of a ball, from which an influence of gravity is removed, which is seen from the pitcher side, is visually displayed.
Figure 15A:
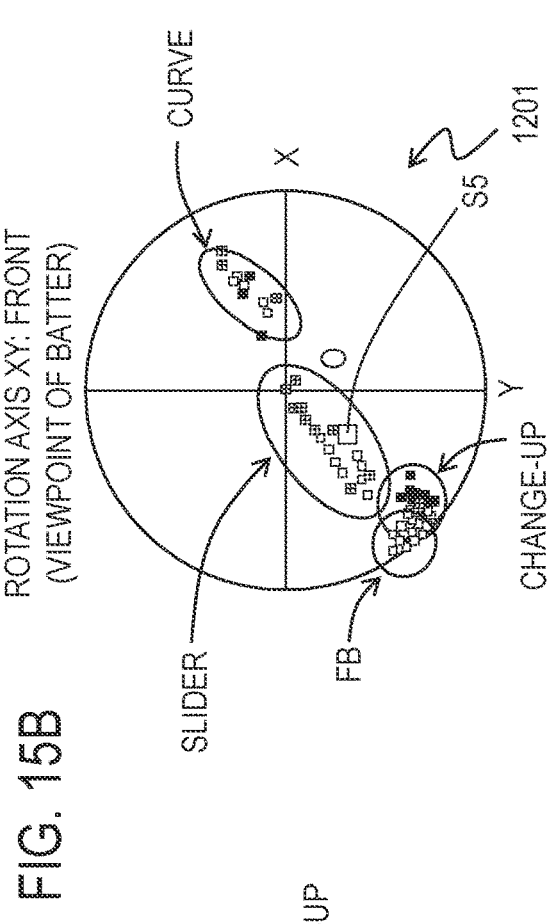
FIG. 15A is a diagram illustrating, as an example, a state where the amount of change in trajectory of a ball, from which an influence of gravity is removed, which is seen from the pitcher side, is visually displayed.
Figure 15B:
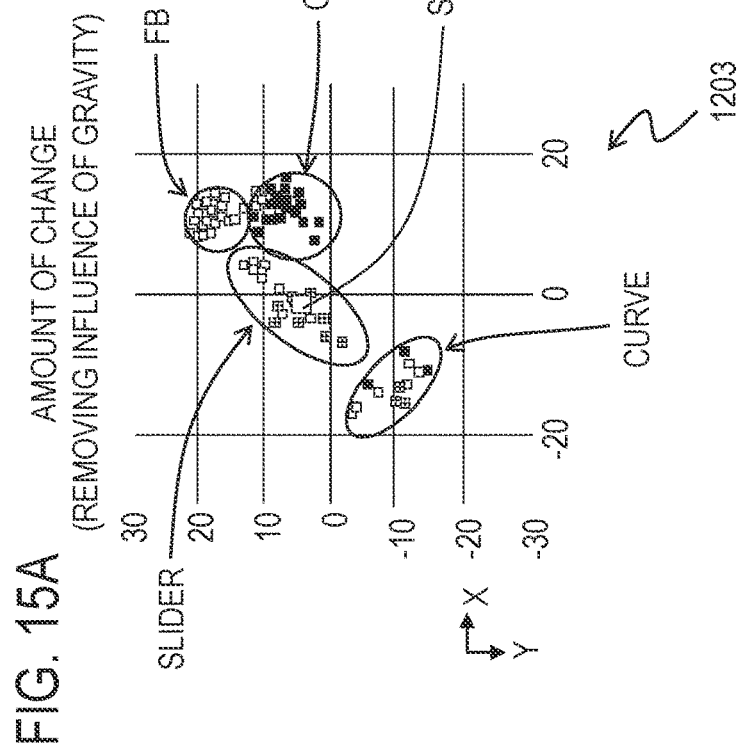
FIG. 15B is a diagram illustrating, as an example, a state where a rotation axis of the ball seen from the batter side in regard to pitching is visually displayed.
Figure 15C:
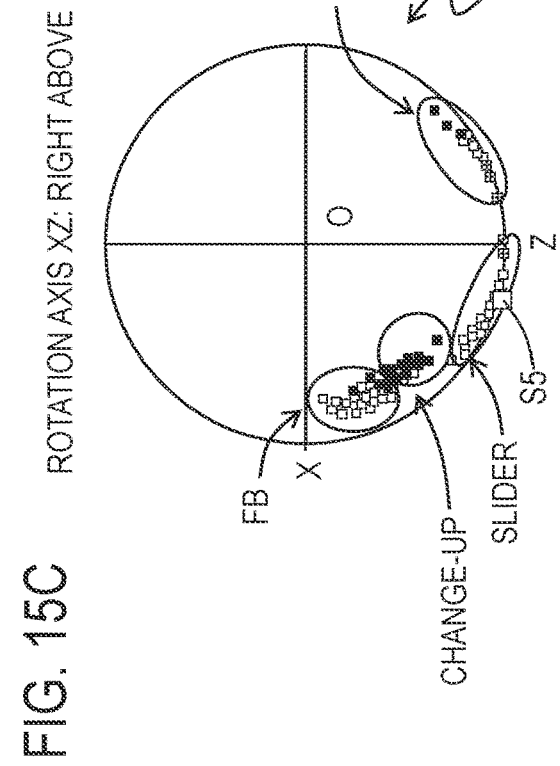
FIG. 15C is a diagram illustrating, as an example, a state where the rotation axis of the ball seen from right above the ball in regard to pitching is visually displayed.
Figure 16A:
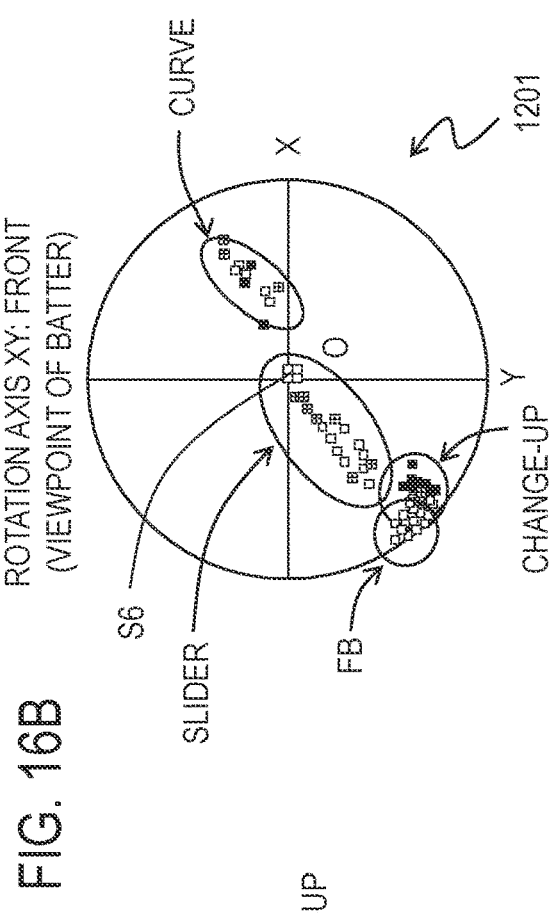
FIG. 16A is a diagram illustrating, as an example, a state where the amount of change in trajectory of a ball, from which an influence of gravity is removed, which is seen from the pitcher side is visually displayed.
Figure 16B:
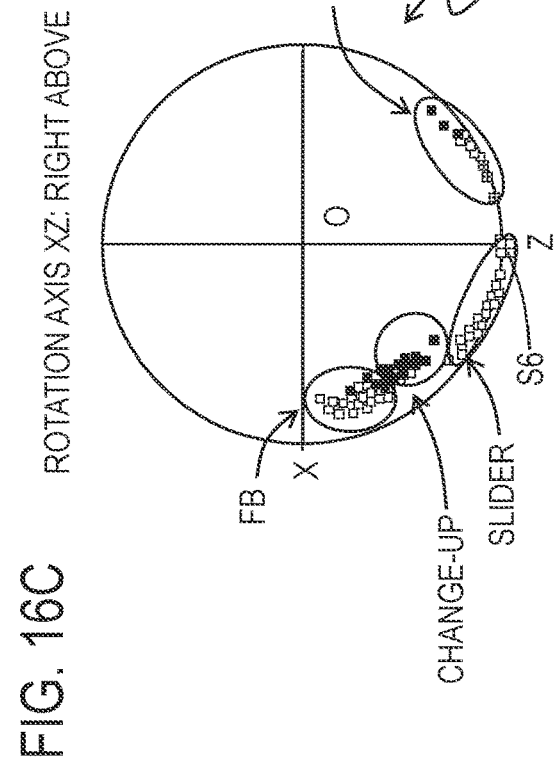
FIG. 16B is a diagram illustrating, as an example, a state where a rotation axis of the ball seen from the batter side in regard to pitching is visually displayed.
Figure 16C:
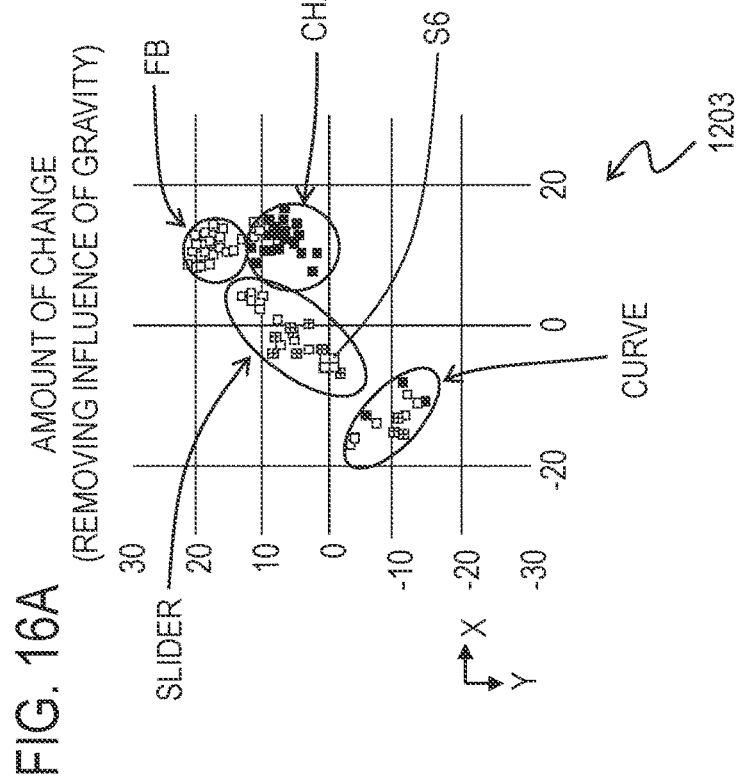
FIG. 16C is a diagram illustrating, as an example, a state where the rotation axis of the ball seen from right above the ball in regard to pitching is visually displayed.

FIGS. 9A to 11C illustrate, as examples, display content on the display units 1201, 1202, and 1203 in a case where a right-handed pitcher performs pitching of a plurality of ball types (curve, slider, change-up, and FB). As illustrated as an example in FIGS. 9A to 9C, the amount of change in trajectory of the ball, from which an influence of gravity of the ball has been removed, and the rotation axis and the amount of rotation of the ball differ depending on the ball type, and a relationship thereof can be visually and intuitively understood from the display units 1201, 1202, and 1203. Although the rotation axes of the balls at the time of change-up and FB are similar to each other, for example, the amounts of rotation significantly differ, and it is possible to ascertain that this leads to a difference in trajectories. Although the amounts of rotation of the ball at the time of curve, slider, and FB are similar to each other, the rotation axes significantly differ, and it is possible to ascertain that this leads to a difference in trajectories. FIGS. 10A to 10C illustrate a state where pitching of slider with a change close to that of curve has been selected, and a mark S1 corresponding to the selected pitching is displayed to be larger than other marks. On the other hand, FIGS. 11A to 11C illustrate a state where pitching of slider of slider that is close to straight has been selected, and a mark S2 corresponding to the selected pitching is displayed to be larger than other marks. In this manner, the amounts of change and the rotation axes differ depending on degrees of the change even in a case of the same ball type, and it is possible to visually and intuitively understand differences from the display units 1201, 1202, and 1203.

FIGS. 12A to 16C illustrate, as examples, display content on the display units 1201, 1202, and 1203 in a case where a left-handed pitcher performs pitching of a plurality of ball types (curve, slider, change-up, and FB). In a case of the left-handed pitcher, the positions of the marks corresponding to the ball types displayed on the display units 1201 and 1202 are vertically opposite (opposite in the Y-axis direction), and the positions of the marks in accordance with the ball types displayed on the display unit 1203 are horizontally opposite (opposite in the X-axis direction) as compared with a right-handed pitcher. It is possible to visually and intuitively understand the amounts of change in trajectory of the balls, from which influences of gravity of the balls have been removed, in accordance with the ball types, and the relationship of the rotation axes and the amounts of rotation of the balls and the ball types from the display units 1201, 1202, and 1203 in this case as well. Also, FIGS. 13A to 16C illustrate a state where pitching of slider with different degrees of change is selected and marks S3, S4, S5, and S6 corresponding to the selected pitching are displayed to be larger than other marks. In this manner, it is possible to visually and intuitively understand differences in amounts of change and rotation axes depending on degrees of change in the case of the same ball type from the display units 1201, 1202, and 1203.

Figure 17A:
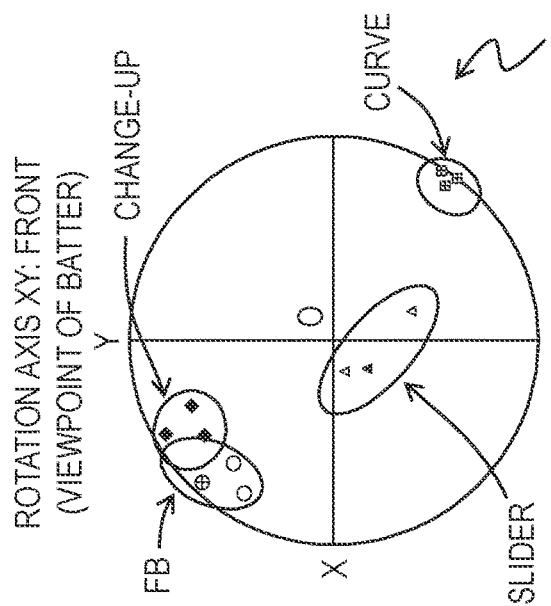
FIG. 17A is a diagram illustrating, as an example, a state where the amount of change in trajectory of a ball, from which an influence of gravity is removed, which is seen from the pitcher side is visually displayed.
Figure 17B:
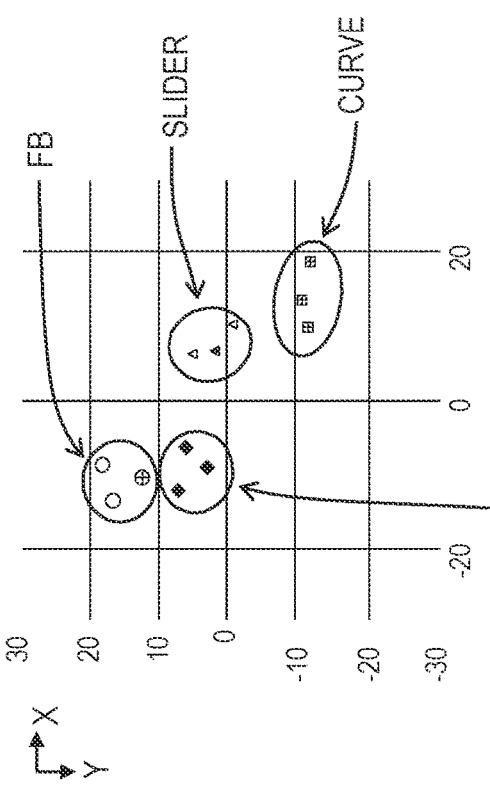
FIG. 17B is a diagram illustrating, as an example, a state where a rotation axis of the ball seen from the batter side in regard to pitching is visually displayed.
Figure 17C:
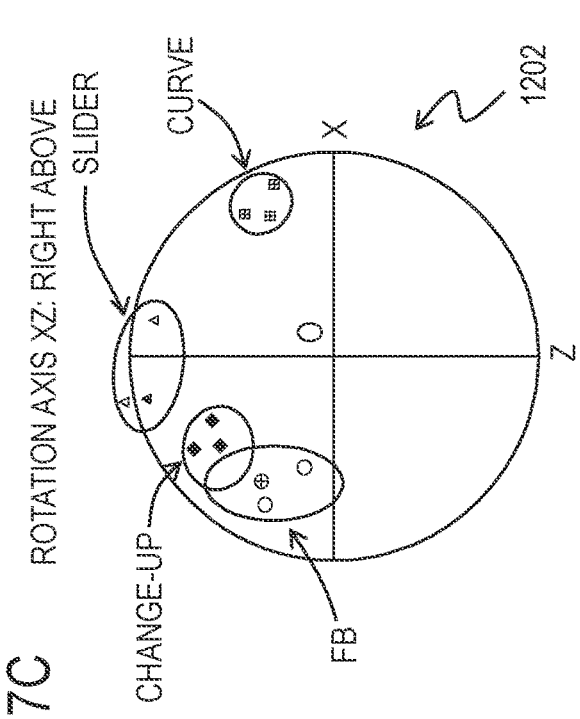
FIG. 17C is a diagram illustrating, as an example, a state where the rotation axis of the ball seen from right above the ball in regard to pitching is visually displayed.

FIG. 17 illustrates an example in which the display device 11 simultaneously displays information in regard to pitching performed a plurality of times (information for displaying motion information) in display forms that are different depending on ball types in each of the display units 1201, 1202, and 1203. In this example, curve is displayed as a square mark, slider is displayed as a triangle mark, change-up is displayed as a diamond mark, and FB is displayed as a circle mark. Also, a rotation axis of a ball belonging to the section of the largest amount of rotation is represented by a framed white mark, a rotation axis of a ball belonging to the section of the smallest amount of rotation is represented by a solid black mark, and a rotation axis of a ball belonging to the section of the intermediate amount of rotation is displayed by a mark with a cross. In this manner, it is possible to visually and intuitively understand the amount of change and a difference in rotation axes in accordance with the ball types since the ball types are visually displayed.

It is thus possible to two-dimensionally display information regarding a rotation axis of a ball moving while rotating in a three-dimensional space such that a relationship with a change in trajectory of the ball is easily understood according to the present embodiment.

Second Embodiment

In the first embodiment, the aforementioned various kinds of information and the pitching video are displayed using the display device 11 such as a display that displays a video on the basis of input information. However, the aforementioned various kinds of information and the pitching video may be projected to a screen, a wall, or the like. Hereinafter, the same reference signs will be similarly used for items that have already been described to simplify the description.

As illustrated as an example in FIG. 1, a motion information display system 1 according to the second embodiment includes a motion information output device 10, a display device 21, and a projection target body 22. The display device 21 in the present embodiment is a device that projects a video based on input information. The projection target body 22 is an object (a screen, a wall, a construction, or the like) to which the video is projected by the display device 21.

In the present embodiment, a display control unit 104 of the motion information output device 10 outputs, to the display device 21, information for displaying motion information regarding pitching performed each time, a pitching attribute, and a pitching video to be displayed. The display device 21 projects, to the projection target body 22, a video on a user interface screen 1000 which visually displays the information for displaying the motion information regarding pitching performed each time, the pitching attribute, and the pitching video output from the display control unit 104 of the motion information output device 10 on the basis of them. Also, audio is output from the display device 21, for example. A user inputs various kinds of information to the input unit 103 while viewing the user interface screen 1000 projected to the projection target body 22. The other configurations are as described above in the first embodiment.

Hardware Configuration

The motion information output device 10 according to each embodiment is a device configured by a general-purpose or dedicated computer including a processor (a hardware processor) such as a central processing unit (CPU) and a memory such as a random access memory (RAM) and a read only memory (ROM), for example, executing a predetermined program. The computer may include one processor and one memory or may include a plurality of processors and a plurality of memories. The program may be installed in the computer or may be recorded in a ROM or the like in advance. Also, some or all of the processing units may be configured using an electronic circuit that realizes the processing functions alone rather than an electronic circuit (circuitry) that realizes the functional configurations by reading the program, such as the CPU. Also, an electronic circuit constituting one device may include a plurality of CPUs.

Figure 18:
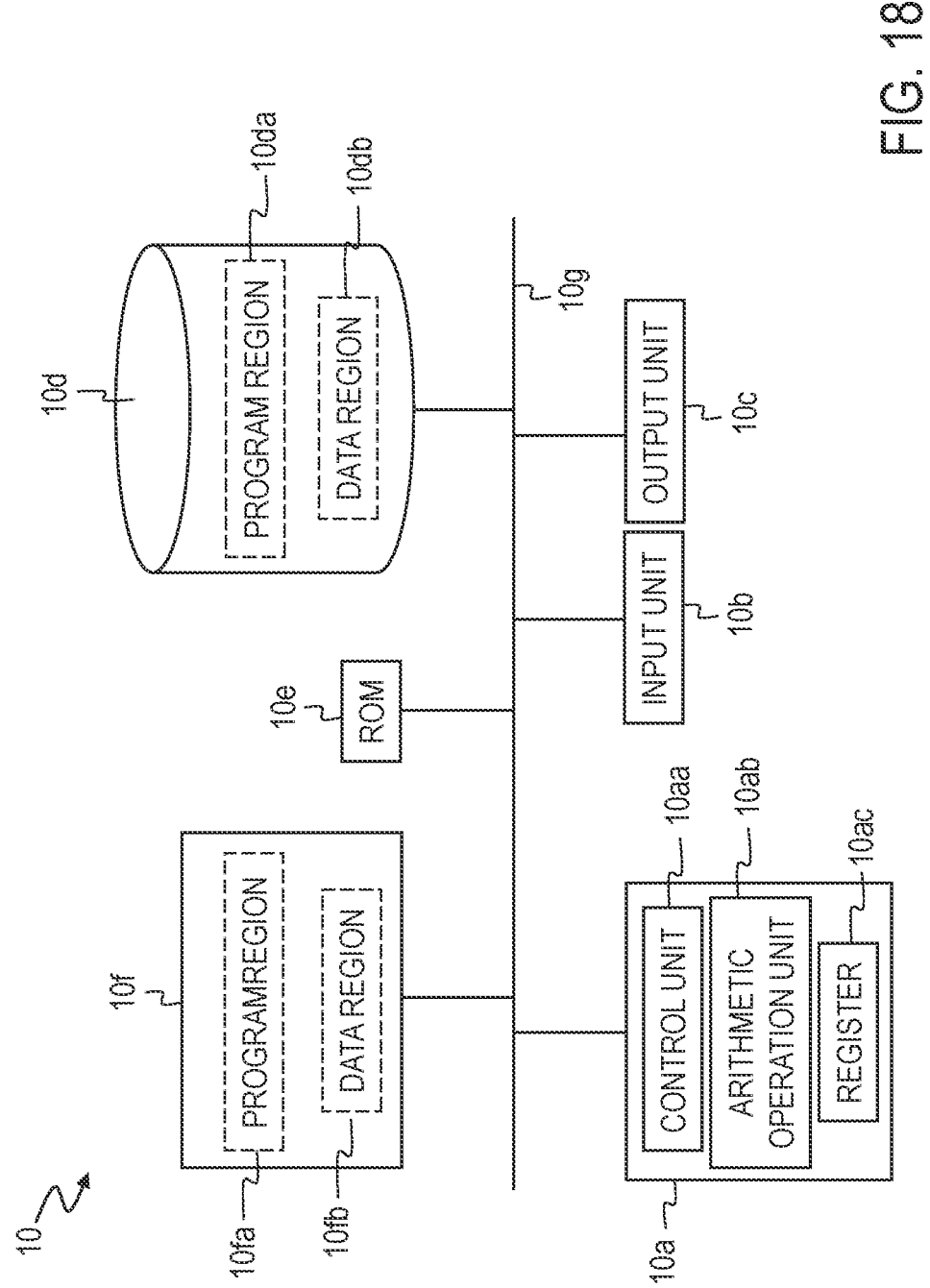
FIG. 18 is a block diagram illustrating, as an example, a hardware configuration of the motion information output device according to the embodiment.

FIG. 18 is a block diagram illustrating, as an example, a hardware configuration of the motion information output device 10 according to each embodiment. As illustrated as an example in FIG. 18, the motion information output device 10 in this example includes a central processing unit (CPU) 10a, an input unit 10b, an output unit 10c, a random access memory (RAM) 10d, a read only memory (ROM) 10e, an auxiliary storage device 10f, and a bus 10g. The CPU 10a in this example includes a control unit 10aa, an arithmetic operation unit 10ab, and a register 10ac and executes various arithmetic operations in accordance with various programs read in the register 10ac. Also, the input unit 10b is an input terminal, a keyboard, a mouse, a touch panel, or the like to which data is input. In addition, the output unit 10c is an output terminal from which data is output, a display, a LAN card or the like controlled by the CPU10a that has read a predetermined program. Also, the RAM 10d is a static random access memory (SRAM), a dynamic random access memory (DRAM), or the like and incudes a program region 10da in which a predetermined program is stored and a data region 10db in which various kinds of data is stored. Additionally, the auxiliary storage device 10f is, for example, a hard disk, a magneto-optical disc (MO), a semiconductor memory, or the like and includes a program region 10fa in which a predetermined program is stored and a data region 10fb in which various kinds of data is stored. Also, the bus 10g connects the CPU 10a, the input unit 10b, the output unit 10c, the RAM 10d, the ROM 10e, and the auxiliary storage device 10f such that information can be exchanged therebetween. The CPU 10a writes, in the program region 10da of the RAM 10d, the program stored in the program region 10fa in the auxiliary storage device 10f in accordance with a read operating system (OS) program. Similarly, the CPU 10a writes, in the data region 10db of the RAM 10d, the various kinds of data stored in the data region 10fb in the auxiliary storage device 10f. Then, addresses on the RAM 10d where the program and the data are written are stored in the register 10ac in the CPU 10a. The control unit 10aa of the CPU 10a sequentially reads these addresses stored in the register 10ac, reads the program and the data from the regions on the RAM 10d indicated by the read addresses, causes the arithmetic operation unit 10ab to sequentially execute arithmetic operations indicated by the program, and stores results of the arithmetic operations in the register 10ac. With such a configuration, the functional configuration of the motion information output device 10 is realized.

The aforementioned program can be recorded in a computer-readable recording medium. An example of the computer-readable recording medium is a non-transitory recording medium. Examples of such a recording medium include a magnetic recording device, an optical disc, a magneto-optical recording medium, a semiconductor memory, and the like.

The program is distributed by selling, giving, or renting, for example, a portable recording medium such as a DVD or a CD-ROM recording the program therein. Furthermore, a configuration in which the program is stored in a storage device in a server computer and the program is distributed by transferring the program from the server computer to other computers via a network may also be employed. As described above, the computer executing such a program stores once the program recorded in the portable recording medium or the program transferred from the server computer first in the storage device of the computer itself, for example. Then, the computer reads the program stored in the storage device of itself and executes processing in accordance with the read program at the time of execution of the processing. Also, in other execution modes of the program, the computer may read the program directly from the portable recording medium and executes the processing in accordance with the program, or alternatively, the computer may sequentially execute the processing in accordance with the received program every time the program is transferred from the server computer to the computer. In addition, a configuration in which the aforementioned processing is executed by a so-called application service provider (ASP)-type service in which the processing functions are realized only through an instruction for execution and acquisition of results without transferring the program from the server computer to the computer may also be employed. Note that it is assumed that the program according to the present mode includes information that is to be subjected to processing performed by an electronic calculator and conforms to the program (data that is not a direct command for the computer but has a characteristic of defining processing of the computer and the like).

Although the present device is configured by causing the predetermined program to be executed on the computer in each embodiment, at least a part of the processing content may be realized by hardware.

Modification Examples and the Like

Note that the present invention is not limited to the aforementioned embodiments. For example, the display control unit 104 outputs the information for displaying the rotation axis of the ball seen from the batter side in regard to pitching performed each time, and the display unit 1201 displays the rotation axis of the ball seen from the batter side in the aforementioned embodiments. However, the display control unit 104 may output information for displaying a rotation axis of a ball seen from the pitcher side in regard to pitching performed each time, and the display unit 1201 may display the rotation axis of the ball seen from the pitcher side.

Also, the display control unit 104 outputs information for displaying the rotation axis of the ball seen from above the ball in regard to pitching performed each time, and the display unit 1202 displays the rotation axis of the ball seen from above the ball in the aforementioned embodiments.

However, the display control unit 104 may output information for displaying a rotation axis of a ball seen from the lower side of the ball in regard to pitching performed each time, and the display unit 1202 may display the rotation axis of the ball seen from the lower side of the ball.

Also, the display control unit 104 outputs information for displaying the amount of change in trajectory of a ball, from which an influence of gravity has been removed, which is seen from the pitcher side in regard to pitching performed each time, and the display unit 1203 displays the amount of change in trajectory of the ball, from which the influence of gravity has been removed, which is seen from the pitcher side, in the aforementioned embodiment. However, the display control unit 104 may output information for displaying the amount of change in trajectory of the ball, from which an influence of gravity has been removed, which is seen from the batter side in regard to pitching performed each time, and the display unit 1203 may display the amount of change in trajectory of the ball, from which the influence of gravity has been removed, which is seen from the batter side. The same applies to the display unit 1204, and the display unit 1204 may display the amount of change in trajectory of the ball, from which the influence of gravity has been removed, which is seen from the batter side. Also, the example in which the display unit 1205 displays the two-dimensional coordinates ($x_4$, $y_4$) representing the position through which the ball has passed on the batter side in the two-dimensional coordinate system of the ball seen from the batter side as the position through which the thrown ball has passed on the batter side has been described in the aforementioned embodiments. However, the display unit 1205 may display the two-dimensional coordinates ($x_4$, $y_4$) representing the position through which the ball has passed on the batter side in the two-dimensional coordinate system of the ball seen from the pitcher side as the position through which the thrown ball has passed on the batter side.

Also, a video obtained by imaging a state of pitching of the pitcher from the batter side (a catcher side; behind a back net) in regard to pitching in which the ball is thrown from the pitcher side to the batter side is used as the pitching video in the aforementioned embodiments. However, a video obtained by imaging a state of pitching from another direction may be used as the pitching video. For example, a video obtained by imaging a state of pitching of the pitcher from the pitcher side, a ceiling side, a stand side, or the like may be used as the pitching video.

Also, the information extraction unit 102 of the motion information output device 10 extracts information for displaying motion information regarding pitching performed each time and stores it in the storage unit 101 in association with a pitching attribute of the pitching performed each time in the aforementioned embodiment. However, if the information for displaying the motion information regarding the pitching performed each time has already been stored in the storage unit 101, the processing can be omitted. Also, the information for displaying the motion information regarding to the pitching performed each time may be generated outside the motion information output device 10 and may be stored in the storage unit 101 of the motion information output device 10. In this case, the information extraction unit 102 of the motion information output device 10 can be omitted. Alternatively, the information for displaying the motion information regarding the pitching performed each time may be generated every time the motion information regarding the pitching performed each time is displayed instead of creating the information in advance.

The example in which the motion information regarding pitching performed by a pitcher of baseball or the like is displayed has been described in the aforementioned embodiments. However, this does not limit the present invention. For example, motion information regarding pitching of softball or the like instead of baseball may be displayed, or motion information of a ball in other ball games such as football, rugby, soccer, and the like instead of the motion information regarding pitching may be displayed. In other words, the motion information output device may output information for displaying rotation axes of balls seen from a first point side or a second point side in regard to one or more motions in which the ball moves from the first point side to the second point side and output information for displaying information representing the rotation axes of the balls seen from an outer side located in a direction that is orthogonal to a virtual straight line connecting the first point to the second point in regard to the motions. Note that examples of the direction that is orthogonal to the virtual straight line connecting the first point to the second point include an upper direction, a lower direction, a lateral direction, and the like of the ball. In this case, the display device 11 may (visually) display the rotation axis of the ball seen from the first point side or the second point side and may (visually) display the information representing the rotation axis of the ball seen from the outer side located in the direction that is orthogonal to the virtual straight line connecting the first point to the second point, and the display device 21 may project them to the projection target body 22. Moreover, the motion information output device may further output information for displaying the amount of change in trajectory of the ball, from which an influence of gravity has been removed, which is seen from the first point side or the second point side. In this case, the display device 11 may further (visually) display the information, or the display device 21 may project them to the projection target body 22. Also, in a case where motion information of an oval ball such as balls for football and rugby is displayed, the display device 11 may further display information representing the posture of the ball, or the display device 21 may project it to the projection target body 22.

Also, the motion information output device 10 and the display devices 11 and 21 may be communicably connected via a network such as the Internet. In this case, the display devices 11 and 21 may be disposed at remote locations from the motion information output device 10. For example, the installation area of the display devices 11 and 21 may be outside the country of the installation area of the motion information output device 10.

Also, the aforementioned various kinds of processing may be executed not only in a chronological manner in accordance with the description but also in parallel or individually in accordance with the processing ability of the devices that execute the processing or as needed. It is needless to say that appropriate modifications can be made without departing from the gist of the present invention.

REFERENCE SIGNS LIST

1, 2 Motion information display system
10 Motion information output device
11, 21 Display device

The invention claimed is:

1. A motion information output device of computerized tracing of a thrown ball in motion, comprising processing circuitry configured to:
   display through a graphical user interface, a first mark at a first two-dimensional coordinate on a first two-dimensional orthogonal coordinate system of a user interface screen of a display, wherein the first mark at the first two-dimensional coordinate is on a first rotation axis of the thrown ball, wherein the graphical user interface comprises a two-dimensional display depicting rotation of the thrown ball in motion;

display, simultaneous to the display of the first mark, in response to an interactively received selection of the first mark in the graphical user interface, through the graphical user interface, a second mark at a second two-dimensional coordinate on a second two-dimensional orthogonal coordinate system of the user interface screen of the display, wherein the second mark at the second two-dimensional coordinate is on a second rotation axis of the thrown ball in motion, the first two-dimensional coordinate and the second two-dimensional coordinate are based on motion information captured by a sensor to measure each pitching performed one or more times of balls thrown from a pitcher side to a batter side, the first rotation axis of the thrown ball seen from the pitcher side or the batter side corresponds to a first straight line passing through the first two-dimensional coordinate and a first origin of the first two-dimensional orthogonal coordinate system, and the second rotation axis of the thrown ball seen from above or below the thrown ball corresponds to a second straight line passing through the second two-dimensional coordinate and a second origin of the second two-dimensional orthogonal coordinate system; and update information for displaying a pitching video of the thrown ball in the graphical user interface according to the interactively received selection of the first mark.

2. The motion information output device according to claim 1, wherein the processing circuitry further outputs information for displaying amounts of change in trajectories of the thrown ball, from which influences of gravity have been removed, which is seen from the pitcher side or the batter side.

3. The motion information output device according to claim 1, wherein the processing circuitry outputs information for simultaneously displaying the information regarding the pitching performed a plurality of times in different display forms in accordance with how large amounts of rotation of the thrown ball is.

4. The motion information output device according to claim 2, wherein the processing circuitry outputs information for simultaneously displaying a plurality of pieces of the information regarding a specific ball type out of the information regarding the pitching performed a plurality of times.

5. The motion information output device according to claim 2, wherein the processing circuitry outputs information for simultaneously displaying the information regarding the pitching performed a plurality of times in different display forms in accordance with ball types.

6. The motion information output device according to claim 2, wherein the processing circuitry outputs information for simultaneously displaying a plurality of pieces of the information regarding selected specific pitching out of the information regarding the pitching performed a plurality of times in a display form that is different from a display form for the information regarding another pitching.

7. The motion information output device according to claim 3, wherein the information regarding the pitching performed the plurality of times is the information in regard to the pitching performed a plurality of times by a same pitcher.

8. A non-transitory computer-readable recording medium storing a program for causing a computer to function as the motion information output device according to claim 1.

9. A motion information output device of computerized tracing of a thrown ball in motion, comprising processing circuitry configured to:

display through a graphical user interface, a first mark at a first two-dimensional coordinate on a first two-dimensional orthogonal coordinate system of a user interface screen of a display, wherein the first mark at the first two-dimensional coordinate is on a first rotation axis of the thrown ball, wherein the graphical user interface comprises a two-dimensional display depicting rotation of the thrown ball in motion;

display, simultaneous to the display of the first mark, in response to an interactively received selection of the first mark in the graphical user interface, through the graphical user interface, a second mark at a second two-dimensional coordinate on a second two-dimensional orthogonal coordinate system of the user interface screen of the display, wherein the second mark at the second two-dimensional coordinate is on a second rotation axis of the thrown ball in motion, the first two-dimensional coordinate and the second two-dimensional coordinate are based on motion information captured by a sensor to measure each of one or more motions of balls moving from a first point side to a second point side, the first rotation axis of a ball seen from the first point side or the second point side corresponds to a first straight line passing through the first two-dimensional coordinate and a first origin of the first two-dimensional orthogonal coordinate system, and the second rotation axis of the ball seen from an outer side located in a direction that is orthogonal to a virtual straight line connecting the first point to the second point corresponds to a second straight line passing through the second two-dimensional coordinate and a second origin of the second two-dimensional orthogonal coordinate system; and update information for displaying a pitching video of the ball in the graphical user interface according to the interactively received selection of the first mark.

10. A non-transitory computer-readable recording medium storing a program for causing a computer to function as the motion information output device according to claim 9.

11. A motion information output method for computerized tracing of a thrown ball in motion, comprising:

displaying, through a graphical user interface, a first mark at a first two-dimensional coordinate on a first two-dimensional orthogonal coordinate system of a user interface screen of a display, wherein the first mark at the first two-dimensional coordinate is on a first rotation axis of the thrown ball, wherein the graphical user interface comprises a two-dimensional display depicting rotation of the thrown ball in motion;

displaying, simultaneous to the display of the first mark, in response to an interactively received selection of the first mark in the graphical user interface, through the graphical user interface, a second mark at a second two-dimensional coordinate on a second two-dimensional orthogonal coordinate system of the user interface screen of the display, wherein
- the second mark at the second two-dimensional coordinate is on a second rotation axis of the thrown ball in motion;
- the first two-dimensional coordinate and the second two-dimensional coordinate are based on motion information captured by a sensor to measure each pitching performed one or more times of balls thrown from a pitcher side to a batter side,
- the first rotation axis of the thrown ball seen from the pitcher side or the batter side corresponds to a first straight line passing through the first two-dimensional coordinate and a first origin of the first two-dimensional orthogonal coordinate system, and
- the second rotation axis of the thrown ball seen from above or below the thrown ball corresponds to a second straight line passing through the second two-dimensional coordinate and a second origin of the second two-dimensional orthogonal coordinate system; and updating information for displaying a pitching video of the thrown ball in the graphical user interface according to the interactively received selection of the first mark.

12. A motion information output method for computerized tracing of a thrown ball in motion, comprising:

displaying, through a graphical user interface, a first mark at a first two-dimensional coordinate on a first two-dimensional orthogonal coordinate system of a user interface screen of a display, wherein the first mark at the first two-dimensional coordinate is on a first rotation axis of the thrown ball, wherein the graphical user interface comprises a two-dimensional display depicting rotation of the thrown ball in motion;

displaying, simultaneous to the display of the first mark, in response to an interactively received selection of the first mark in the graphical user interface, through the graphical user interface, a second mark at a second two-dimensional coordinate on a second two-dimensional orthogonal coordinate system of the user interface screen of the display, wherein
- the second mark at the second two-dimensional coordinate is on a second rotation axis of the thrown ball in motion,
- the first two-dimensional coordinate and the second two-dimensional coordinate are based on motion information captured by a sensor to measure each of one or more motions of balls moving from a first point side to a second point side,
- the first rotation axis of a ball seen from the first point side or the second point side corresponds to a first straight line passing through the first two-dimensional coordinate and a first origin of the first two-dimensional orthogonal coordinate system, and
- the second rotation axis of the ball seen from an outer side located in a direction that is orthogonal to a virtual straight line connecting the first point to the second point corresponds to a second straight line passing through the second two-dimensional coordinate and a second origin of the second two-dimensional orthogonal coordinate system; and updating information for displaying a pitching video of the ball in the graphical user interface according to the interactively received selection of the first mark.

* * * * *